(12) United States Patent
Grosse

(10) Patent No.: US 11,615,234 B2
(45) Date of Patent: Mar. 28, 2023

(54) SYSTEM AND METHOD FOR AUTOMATED DATA IMPORTATION, PROCESSING, AND FORM SUBMITTAL

(71) Applicant: Bradley W. Grosse, College Station, TX (US)

(72) Inventor: Bradley W. Grosse, College Station, TX (US)

(73) Assignee: Bradley W. Grosse, College Station, TX (US)

( * ) Notice: Subject to any disclaimer, the term of this patent is extended or adjusted under 35 U.S.C. 154(b) by 0 days.

(21) Appl. No.: 17/072,309

(22) Filed: Oct. 16, 2020

(65) Prior Publication Data

US 2021/0397784 A1    Dec. 23, 2021

Related U.S. Application Data

(60) Provisional application No. 63/040,868, filed on Jun. 18, 2020.

(51) Int. Cl.
| | | |
|---|---|---|
| *G06F 40/174* | (2020.01) | |
| *G06F 16/93* | (2019.01) | |
| *G06F 40/186* | (2020.01) | |
| *H04L 51/56* | (2022.01) | |

(52) U.S. Cl.
CPC ............ *G06F 40/174* (2020.01); *G06F 16/93* (2019.01); *G06F 40/186* (2020.01); *H04L 51/56* (2022.05)

(58) Field of Classification Search
CPC ...... G06F 40/174; G06F 16/93; G06F 40/186; H04L 51/56
See application file for complete search history.

(56) References Cited

U.S. PATENT DOCUMENTS

| | | | | |
|---|---|---|---|---|
| 6,490,601 B1* | 12/2002 | Markus | ................ | G06Q 50/188 709/219 |
| 6,981,028 B1* | 12/2005 | Rawat | ................... | G06Q 40/04 709/217 |
| 7,206,998 B2* | 4/2007 | Pennell | ............. | G06Q 30/0633 715/224 |
| 7,330,876 B1* | 2/2008 | Rawat | ................ | H04L 63/0815 709/205 |
| 7,920,101 B2* | 4/2011 | Lum | .................... | G03G 15/502 358/1.15 |
| 7,941,743 B2* | 5/2011 | Reddy | ................ | G03G 15/5087 715/221 |
| 8,006,176 B2* | 8/2011 | Reddy | ................ | H04N 1/00973 715/221 |

(Continued)

*Primary Examiner* — Benjamin Smith
(74) *Attorney, Agent, or Firm* — Dickinson Wright PLLC; Jonathan H. Harder

(57) ABSTRACT

A method including receiving information pertaining to a client entity; storing the information in a database; receiving, from a user interface of an application communicatively coupled to the database, a first selection to perform a first task; determining, based on the first task, a first subset of document templates to populate from a plurality of document templates; retrieving the first subset of document templates from the database; populating the first subset of document templates using the information pertaining to the client entity to generate a first populated subset of documents; and performing the first task using the first populated subset of documents.

20 Claims, 23 Drawing Sheets

(56) References Cited

U.S. PATENT DOCUMENTS

| | | | | |
|---|---|---|---|---|
| 8,106,922 B2* | 1/2012 | Lum | | G06K 15/00 345/619 |
| 8,260,797 B2* | 9/2012 | Tordella | | G06F 40/174 707/758 |
| 8,270,003 B2* | 9/2012 | Lum | | G03G 15/5087 715/236 |
| 9,218,332 B2* | 12/2015 | Bhatia | | H04L 67/02 |
| 9,607,058 B1* | 3/2017 | Gupta | | G06K 9/2081 |
| 9,928,227 B2* | 3/2018 | Allen | | G06F 40/30 |
| 9,928,229 B2* | 3/2018 | Allen | | G06F 40/30 |
| 10,943,063 B1* | 3/2021 | Mccown | | G06F 21/31 |
| 11,403,459 B1* | 8/2022 | Spirig | | H04L 67/565 |
| 2002/0013788 A1* | 1/2002 | Pennell | | G06Q 20/108 715/224 |
| 2005/0149854 A1* | 7/2005 | Pennell | | G06F 16/957 707/E17.119 |
| 2005/0256841 A1* | 11/2005 | Rawat | | G06Q 30/04 |
| 2005/0288955 A1* | 12/2005 | Lewiss-Hachmeister | | G06Q 30/02 705/38 |
| 2006/0059434 A1* | 3/2006 | Boss | | G06F 16/9535 715/780 |
| 2006/0077444 A1* | 4/2006 | Lum | | G03G 15/502 358/1.15 |
| 2006/0095542 A1* | 5/2006 | Reddy | | H04N 1/32117 709/217 |
| 2006/0179404 A1* | 8/2006 | Yolleck | | G06F 40/174 715/272 |
| 2006/0279474 A1* | 12/2006 | Lum | | G03G 15/5087 345/2.1 |
| 2006/0279475 A1* | 12/2006 | Lum | | H04N 1/00204 345/2.1 |
| 2007/0078805 A1* | 4/2007 | Reddy | | G03G 15/5091 |
| 2008/0030793 A1* | 2/2008 | Van Hoof | | H04N 1/00209 358/403 |
| 2008/0071808 A1* | 3/2008 | Hardt | | G06F 40/174 |
| 2009/0106296 A1* | 4/2009 | Sickmiller | | G06F 40/174 707/E17.118 |
| 2010/0241642 A1* | 9/2010 | Tordella | | G06F 40/174 707/758 |
| 2014/0129914 A1* | 5/2014 | Agarwal | | G06F 40/174 715/226 |
| 2015/0205776 A1* | 7/2015 | Bhatia | | G06Q 30/02 715/224 |
| 2016/0070691 A1* | 3/2016 | Bhatia | | H04W 4/21 715/226 |
| 2016/0275454 A1* | 9/2016 | Shiryaev | | G06Q 10/1053 |
| 2017/0052938 A1* | 2/2017 | Allen | | G06F 40/174 |
| 2017/0052940 A1* | 2/2017 | Allen | | G06F 40/30 |
| 2017/0132200 A1* | 5/2017 | Noland | | G06F 40/186 |
| 2017/0242852 A1* | 8/2017 | Clain | | G06F 9/451 |
| 2017/0249592 A1* | 8/2017 | Rossi | | G06F 40/174 |
| 2018/0315004 A1* | 11/2018 | Lecourtier | | G06Q 10/083 |
| 2018/0315143 A1* | 11/2018 | Rang | | G06N 5/04 |
| 2019/0104113 A1* | 4/2019 | Pei | | G06F 16/27 |
| 2020/0034940 A1* | 1/2020 | Parikh | | G06Q 50/163 |
| 2020/0110795 A1* | 4/2020 | Gupta | | G06F 16/285 |
| 2021/0117614 A1* | 4/2021 | Lamaute | | G06F 40/174 |
| 2021/0295030 A1* | 9/2021 | Hwang | | G06F 3/0488 |
| 2022/0138690 A1* | 5/2022 | Anjum | | G06F 40/131 705/80 |
| 2022/0253595 A1* | 8/2022 | Staley | | G06F 16/93 |

* cited by examiner

SYSTEM AND METHOD FOR AUTOMATED DATA IMPORTATION, PROCESSING, AND FORM SUBMITTAL

CROSS-REFERENCE TO RELATED APPLICATIONS

This application claims priority to and the benefit of U.S. Prov. Pat. App. 63/040,868, filed Jun. 18, 2020, and titled "System and Method for Automated Data Importation, Processing and Form Submittal". The content of this provisional application is incorporated herein by reference in its entirety.

BACKGROUND

Data importation, processing, and form submittal are often time- and labor-intensive processes. Automation of these processes seeks to reduce costs and increase accuracy, as well as provide other technical benefits.

SUMMARY

Representative embodiments set forth herein disclose various techniques for enabling a system and method for automated data importation, processing, and form submittal.

In some embodiments, a method includes receiving information pertaining to a client entity. The method further includes storing the information in a database. The method further includes receiving, from a user interface of an application communicatively coupled to the database, a selection to perform a first task. The method further includes determining, based on the first task, a first subset of document templates to populate from a plurality of document templates. The method further includes retrieving the first subset of document templates from the database. The method further includes populating the first subset of document templates using the information pertaining to the client entity to generate a first populated subset of documents. The method further includes performing the first task using the first populated subset of documents.

In some embodiments, a tangible, non-transitory computer-readable medium storing instructions that, when executed, cause a processing device to receive information pertaining to a client entity. The instructions further cause the processing device to store the information in a database. The instructions further cause the processing device to receive, from a user interface of an application communicatively coupled to the database, a selection to perform a first task. The instructions further cause the processing device to determine, based on the first task, a first subset of document templates to populate from a plurality of document templates. The instructions further cause the processing device to retrieve the first subset of document templates from the database. The instructions further cause the processing device to populate the first subset of document templates using the information pertaining to the client entity to generate a first populated subset of documents. The instructions further cause the processing device to perform the first task using the first populated subset of documents.

In some embodiments, a system includes a memory device storing instructions and a processing device communicatively coupled to the memory device, wherein the processing device executes the instructions to receive information pertaining to a client entity. The processing device further executes the instructions to store the information in a database. The processing device further executes the instructions to receive, from a user interface of an application communicatively coupled to the database, a selection to perform a first task. The processing device further executes the instructions to determine, based on the first task, a first subset of document templates to populate from a plurality of document templates. The processing device further executes the instructions to retrieve the first subset of document templates from the database. The processing device further executes the instructions to populate the first subset of document templates using the information pertaining to the client entity to generate a first populated subset of documents. The processing device further executes the instructions to perform the first task using the first populated subset of documents.

BRIEF DESCRIPTION OF THE DRAWINGS

For a detailed description of example embodiments, reference will now be made to the accompanying drawings in which.

NOTATION AND NOMENCLATURE

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
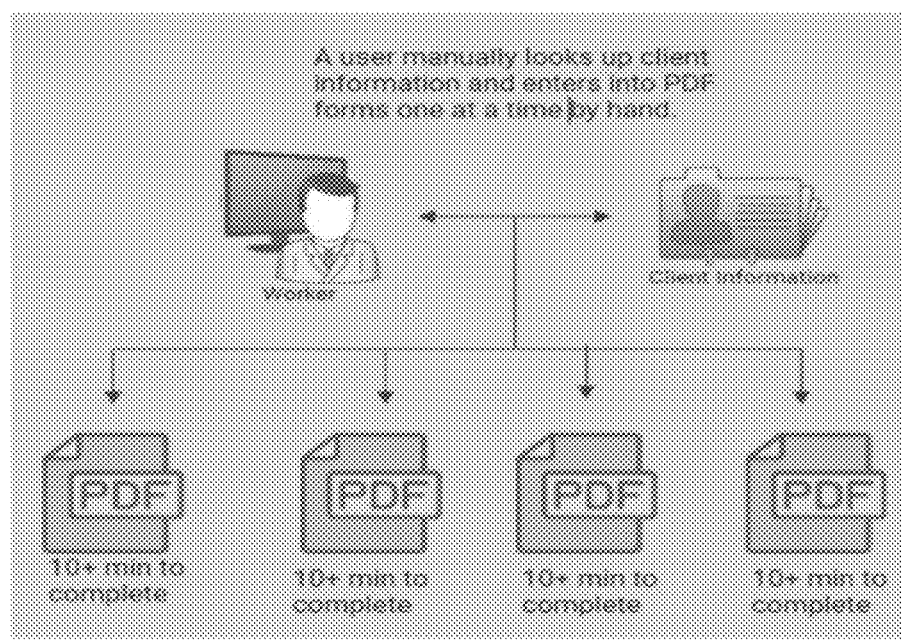
FIG. 1 illustrates a prior art method of data importation, processing, and form submittal.

Companies often have to send large numbers of packets, consisting of a number of different PDF forms, to another entity on behalf of their workers or clients. These forms may be external PDF forms (forms associated with and/or created (i.e., formatted) by another entity). These may be various employment forms going to HR for a new employee, medical and financial forms sent to a healthcare provider for a client, or an application to any number of government programs for a client. Often, these forms are submitted by the use of PDF files. Users would be sent a number of PDF forms to fill out or download them from a website. Then the user would have to open up the PDF, fill it out while manually searching for any needed information, save the form, and then either email it, upload it to a website, or print it out and fax or mail it in. This would then have to be done for every form in the packet. This is a very time intensive if there are 5+ forms in a packet and each one takes five to ten or more minutes to complete, as shown in FIG. 1. Then multiply that for every client of a company. Labor has to scale up with client numbers in order to be able to process everything in a timely matter.

Filling out multiple forms per client manually also introduces other problems. Forms like that often share a core set of information across all forms, like personal information. Manually entering that over and over again increases the chances of mistakes being made. This can be particularly time consuming when dealing with forms requested by outside groups (e.g., external forms).

Further, filling forms out manually makes it quite difficult to manage in a team environment. The status of each form has to somehow be tracked so each member of the team knows exactly which forms are completed and what information is still missing in the incomplete forms. All of that would have to be done manually, adding yet more time and effort to the process.

Then all those manually filled PDF need to be signed somehow. Often this would be performed by emailing the client the PDFs. If the client is savvy enough, they can sign directly in the PDF. If not, they will need to print out the form, sign it, scan it back in, and email it back to the company. This can cause a problem if a mistake is found later in the form, as mistakes are not easily corrected in a scanned document. Having to manually keep track of signed, returned forms via email, mail, or website upload again increases the burden of having to somehow track all of the comings and goings of the forms and share that information with the team.

Another option is to manually upload the PDF forms needing signing to an electronic document signing service, like DocuSign, SignRequest, or any other suitable service. However, this takes more time and effort to log into online accounts, upload the files, mark the places where signatures are needed, copy-and-paste email addresses, and then send e-mails to be signed. Tracking the status of all those forms also involves time and labor, especially when having to keep a team updated on document statuses.

Figure 2:
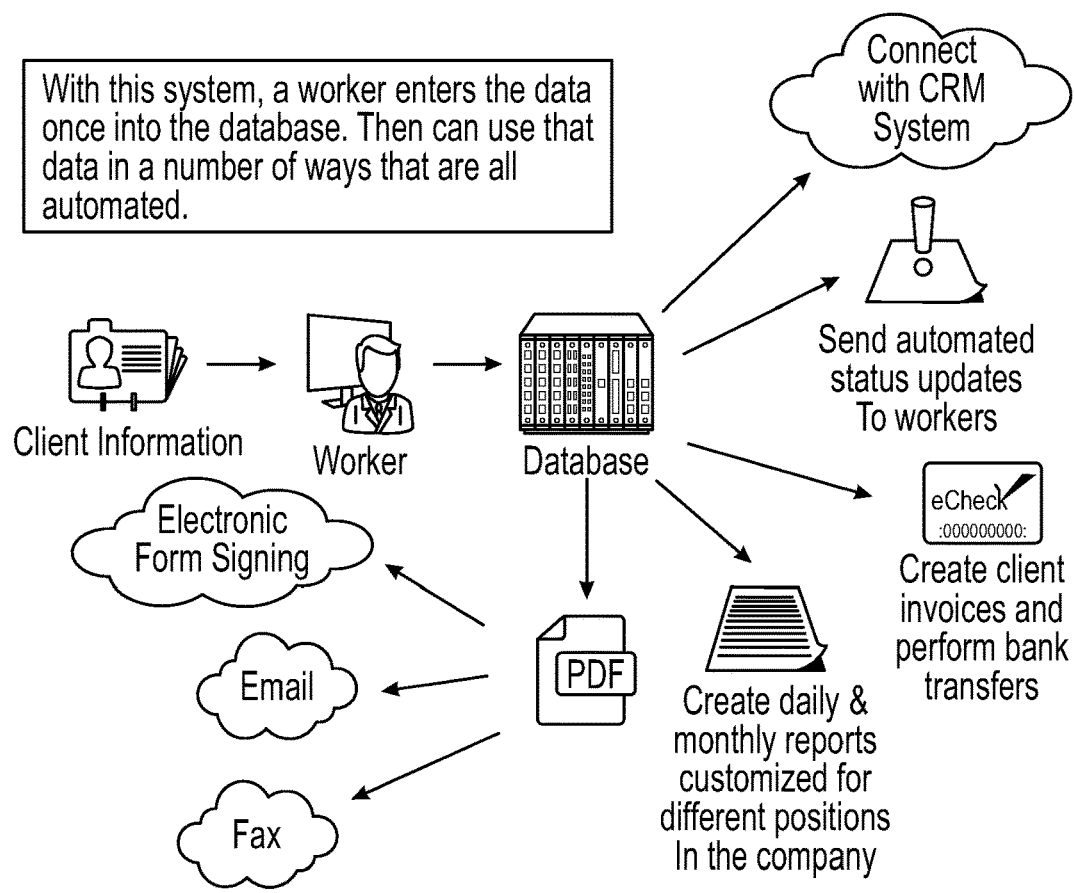
FIG. 2 illustrates a system of data importation, processing, and form submittal in accordance with aspects of the present disclosure.
Figure 3:
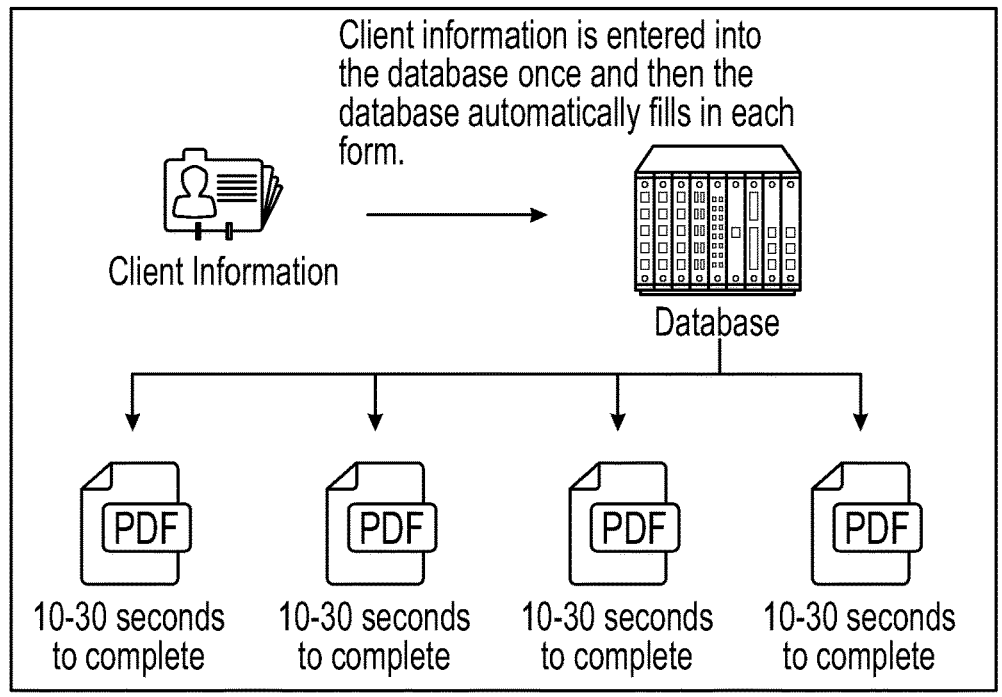
FIG. 3 illustrates a method of data importation, processing, and form submittal in accordance with aspects of the present disclosure.

A database may be used to address these problems and more by taking the client's pre-filled data and then automatically filling any number of PDF files from any source and then outputting them for submittal in a variety of different ways, as shown in FIG. 2. This may dramatically reduce the time needed for each form, for example, to ten to thirty seconds or less, and thus total time, as shown in FIG. 3. Further, it may provide technical benefits by only requiring the entry of the user data sent over a network one time, without having to request the same information be resubmitted in another transmission over the network. Thus, network resources may be saved by reducing the amount of data transmissions over the network, thereby providing a technical solution.

An aspect of the disclosure is a database system that connects to fifteen or more different online services to provide a company a complete workflow to process, use, and output client data in an automated fashion. Each component of the database such as client data entry, electronic form signing, faxing, emailing, notifications, invoicing, etc. is completely automated due to use of the APIs provided by each service.

For example, if a user needs to fax a form off to a doctor's office for particular client. To do so, they would simply click a button, say 'Send ADL Forms'. By clicking that specific button, the database is programmed to load two specific blank medical PDF form templates into memory. The database may then use a third-party software plug-in to take the needed client information from the database and then insert it into the PDF forms.

The same plug-in may be used to automatically create a fax cover sheet with the user and client's information. The cover sheet is automatically combined with the medical forms and uploaded to the faxing service via CURL and their APIs. The faxing service then sends the fax.

From an operator's point of view, this can all be accomplished with the click of one button. Accordingly, computing resources may be reduced because one click of a button may perform a multitude of operations via application programming interfaces (APIs) without having to open different respective applications that individually perform those operations.

Each component may operate in the same manner. The database may determine exactly which forms are needed for a given client and a given operation, so every sub-process can be reduced down to one button press of an operator.

An aspect of the disclosure may include a system that takes forms from other entities (e.g., government forms from the Veteran Affairs (VA), record request forms from the National Archives, credit application and Automated Clearing House (ACH) forms from banks, etc.) and is configured to automatically fill those in with one press of a button. This allows for increased ease in updating forms when changes are necessary. For example, the VA updates its forms every few years. With this system, the old, blank template is replaced with the new, blank template, and business can continue with little or no business impact.

In some embodiments, every sub-component is completely automated. For example, one click selects the correct forms, fills them out, and then faxes them. One click can create and send form for electronic signatures. One click can create invoices and payments in QuickBooks.

Everything is automated by using third-party services for each sub-component and then utilizing their APIs and webhooks to directly interact with those services all from within the database system. Using third-party services allows the database system to be very modular. These services may operate with the use of API systems that work in a like matter. That may allow existing services to be changed based on a company's current need by swapping out the old service's specific API commands for the new ones. For example, if the cost of a faxing service increases, a company may switch to a new one with minimal code changes. New functions/abilities may also be added to the database system by copying an existing sub-component, modifying the API commands, and then changing a bit of code to fully integrate the new service into the overall workflow. This modularity by using third-party services may allow companies to change features/functions or add new ones in a cost-saving way. First, reducing costs initially by reducing the amount of coding the company's developers need to perform to get a particular feature functional. Then, time spent on database maintenance may be reduced since each third-party service is responsible for their own bug fixes and function additions. A company's developers only need to focus on their own bug-fixes and database changes.

All of this automation greatly reduces the time spent working on each set of forms which allows each worker to handle many more cases. It also allows cases to be completed quicker, because it allows workers to focus, or specialize, on just one or two components of the overall-all workflow. This focus may increase their efficiency due to familiarity and experience. Automating the different sub-components may also allow greater event tracking and team notifications which may reduce time the completion time for each case, client, or form packet.

Aspects of the disclosure include a system that automatically imports client data into system using specially prepared PDF data collection form. This function may be provided by DynaPDF plug-in for MBS plug-in or any other suitable program or service.

Aspects of the disclosure include a system that automatically exports that data into any number of individual PDF forms from any source, like medical, financial, or government forms. This function may be provided by DynaPDF plug-in for MBS plug-in or any other suitable program or service.

Aspects of the disclosure include a system that automatically sends the filled PDF files to clients for electronic signatures. This function may be provided by SignRequest or any other suitable program or service.

Aspects of the disclosure include a system that provides a place to upload client related files directly to the database where they are automatically labeled and organized behind the scenes on the server. This function may be provided by SuperContainer or any other suitable program or service.

Aspects of the disclosure include a system that connects to third-party services to provide automated system updates, alerts, status reports, and other notifications via text message (this function may be provided by Twilio or any other suitable service provider), email (this function may be provided by SendInBlue or any other suitable service provider), Slack (this function may be provided by Slack or any other suitable service provider), CRM (customer relationship management or any other suitable service provider) systems (function provided by CRM system, in this case Pipe Drive, or any other suitable service provider), or any other suitable notification system.

Aspects of the disclosure include a system that connects to a third-party service to automatically create, buy, and track shipping labels. This function may be provided by Shippo or any other suitable service provider.

Aspects of the disclosure include a system that connects to a third-party service to automatically create invoices pay those invoices with ACH bank transfers. This function may be provided by QuickBooks or any other suitable service provider.

Aspects of the disclosure include a system that connects to third-party services to verify/validate certain client information. This function may be provided by Zillow for determining the lot size of a client's property, by GoShippo for validating mailing addresses, or by any other suitable service provider.

Aspects of the disclosure include a system that connects to third-party services to provide mapping of various client information, such as where they live and different demographic numbers per county. This function may be provided by Google maps or any other suitable service provider.

Aspects of the disclosure include a system that uses a third-party service to provide the company/team a central listing of problems, questions, missing items, or incorrect information to simplify and increase efficiency of collaborative work. This function may be provided by CRM system, in this case PipeDrive, or any other suitable service provider.

Aspects of the disclosure include a system that automatically creates daily/monthly reports in the form of custom made Excel spreadsheets to target many different uses. Such as a monthly report for the managers to show all the monthly and yearly sales numbers and client break-downs, reports for case reps showing the status of each case including the number of missing items, documents, etc. Or reports showing invoice and bank loan numbers for each case for the accountants. This function may be provided by the LibXL plug-in for the MBS plug-in, or any other suitable service provider.

Aspects of the disclosure include a system that automatically filling a PDF form and then faxing it. This function may be provided by DynaPDF plug-in for MBS plug-in for form filling, by Phaxio for faxing, or by any other suitable service provider.

Aspects of the disclosure include a system that automatically receive updates to most third-party services through the use of webhooks. These updates are then presented to the users in a central dashboard where they can get an overview of the status of a case. This function may be provided by the individual service working through the FM-API service (e.g., FM-API receives the webhooks from each service provider and then passes it into the database), or any other suitable service provider.

Aspects of the disclosure include a system that automatically performs checks on data as it is entered/imported to correct specified errors.

Aspects of the disclosure include a system that automatically checks certain data to make sure it meets minimum requirements, like checking a veteran's military service dates to ensure they served during a specific period of time.

Aspects of the disclosure include a system that automatically determines exactly which forms are needed for a specific task. For example, if sending medical forms to a doctor, it knows to just load and fill the 2680 and FV12 forms. If sending out a packet to a new client, it knows to fill and send the 0966, HIPAA, client contract, and credit application forms. No need to tell it what is needed each time.

Aspects of the disclosure include a system that allows all documentation related to a client to be uploaded and organized automatically.

Aspects of the disclosure include a system that provides a system to use uploaded documents to verify and then lock certain data from future changes, such as checking a veteran's entered military to the uploaded DD214 form or checking a veteran's marriage information to the uploaded marriage certificate.

Aspects of the disclosure include a system that provides a sub-system to review a client's complete set of filled out forms and then approve those forms for final submittal Aspects of the disclosure include a system that marks completed dates for items along the entire workflow.

Aspects of the disclosure include a system that tracks and charts a wide-range of company performance and client demographic stats.

Figure 4:
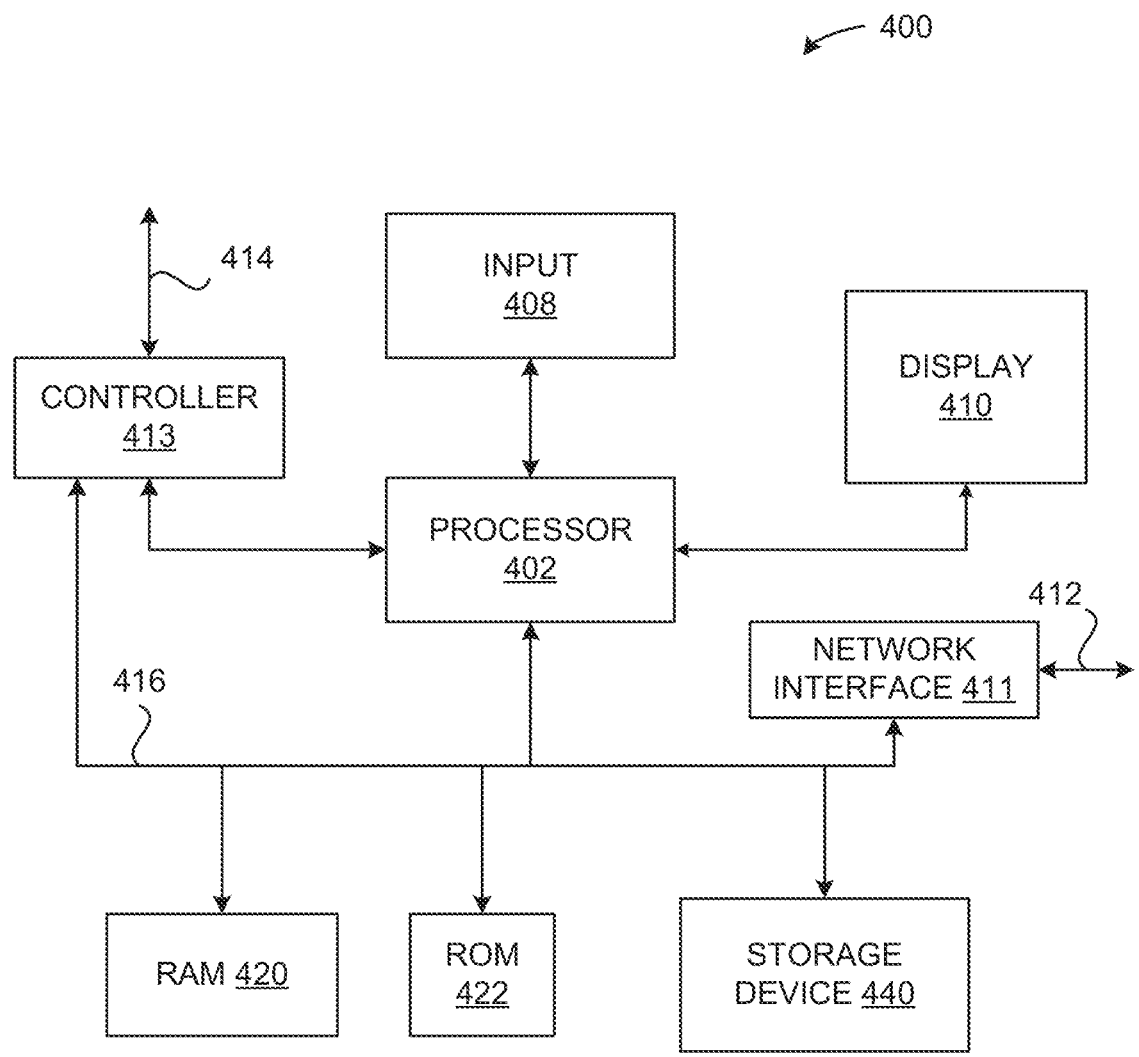
FIG. 4 illustrates a detailed view of a computing device that can be used to implement the various systems and methods described herein, in accordance with aspects of the present disclosure.

FIG. 4 illustrates a detailed view of a computing device 400 that can be used to implement the various components described herein, according to some embodiments. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives), and includes a storage management module that manages one or more partitions within the storage device 440. In some embodiments, storage device 440 can include flash memory, semiconductor (solid-state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of processes and applications executing on the computing device.

The following is an examples of software components and third-party services that may be used in creation of an aspect of the disclosure. These are non-limiting examples, and any other suitable service, program, and/or components may be used in their place as discussed with regards to the present disclosure.

FileMaker Advanced and FileMaker Server by Claris International Inc. FileMaker Advanced is an application used to create databases in a GUI environment instead of a traditionally programed database using a command line interface. This allows anyone with page-layout experience to quickly get started developing databases. FileMaker was used to create an example of this database. FileMaker Server is a specialized version of FileMaker that runs on a centralized server. Its function is to host and share access to database files created by FileMaker Advanced. Users log-in to the FileMaker Server to access the hosted database. Access to the database is usually accomplished with FileMaker Advanced, which provides access to the complete set of functions. FileMaker Server allows access using a standard web browser.

MBS FileMaker Plug-in by Monkeybread Software. MBS FileMaker provides additional functions to FileMaker. Main function sets used include Container (functions to manipulate files stored in the database), CURL (upload and download with FTP/SFTP/FTPS/HTTP/HTTPS), Dialog (shows a message dialog with icon and customized buttons), DynaPDF (create, import and modify PDFs on Mac OS X and Windows), JSON (parse or build JSON texts), List (text functions for working with text lists), Menu (functions to create menus and show them as popup menu), Plugin (central plugin management functions), SendMail (create emails and send them), Text (functions for working with text), WebView (allows the display of internet web pages and graphic files inside of the database), XL (read and write Excel files).

DynaPDF MBS Plug-in by DynaForms GmbH. DynaPDF is a third-party component for the MBS plug-in that allows advanced PDF operations. These operations include scanning a PDF file, extracting the data in each box, and inserts it into the client's record in the database. This allows automated importation of all client information from a pre-filled PDF form. For example, if DynaPDF detects the 'First Name' box in a PDF form and then copies the name 'John' into the client's information file at database field 'client_NameFirst'. These operations also include taking information from the database and inserting it into the appropriate box on the form. For example, reads the database field 'client_NameFirst', gets the name 'John', and then pastes it into the PDF box 'First Name'. These operations include allowing the database to insert graphics into forms. For example, a user's signature can be automatically 'stamped' onto the form when they approve it. This saves the time and trouble of printing out the form, signing, scanning, and re-uploading the form.

LibXL MBS Plug-in by XLware is a third-party component for the MBS plug-in that allows custom Microsoft Excel spreadsheets to be created with database. Custom spreadsheets can be made for a wide-range of uses, such as monthly client and company status reports for managers, daily case status reports for case reps, monthly financial reports for accountants, and monthly personnel reports for HR.

SuperContainer by 360Works is a software package that can run on the same server as FileMaker Server. SuperContainer handles the uploading of documents into the FileMaker databases. Files uploaded using the database interface can be handled by SuperContainer behind the scenes separately from FileMaker. It provides much more control of how the files are organized on the server.

SuperContainer Companion FileMaker Plug-in by 360Works is a plug-in for SuperContainer that provides FileMaker access to the files being handles by SuperContainer. Even though a file is uploaded to the database using the FileMaker interface, SuperContainer is actually handling the upload of the file. FileMaker itself does not know where the uploaded files are. This plug-in is used to tell FileMaker where to find a specific file on the server. This plug-in is also used to get and store the date whenever a file is uploaded to the server, such as a PDF form. This enables the database to alert users if deadlines are missed or show users which documents/forms are missing for a particular client.

SignRequest is a web service that can be used for electronic document signing.

QuickBooks is a web service that can be used for the creation and payment of client invoices.

Phaxio is a web service that can be used for faxing documents.

Shippo is a web service that can be used for creating shipping labels that can also be used to validate client mailing addresses.

Zillow is a web service that can be used to look up the size of the client's property lot.

Google Maps is a web service that can be used to create maps showing different client data, such as a map showing client locations across the state or a map showing number of clients in each county.

Sendinblue is a web service that can be used for sending email.

Slack is a service that that can be used as a communication hub/system for companies. The system can use this to send general and individual status updates to Slack.

PipeDrive is a web-based CRM (Customer Relationship Management) system that can be used in conjunction with the database system to help a team of collaborators track and manage the functions being performed by the database system. I.e., show alerts, status updates, and completion dates for items being performed by the database system. This allows a comprehensive way for a 'data entry team' to work with a 'client representative team' in a company.

Zapier is a web service that can be used to connect two or more separate applications/services. Once connected, Zapier can then automate functions between the two services. For example, a Zapier 'app' connects our Phaxio account to a Google Drive account.

Whenever a new fax comes in to Phaxio, Zapier sees that it has come in and then automatically saves it to the designated folder on Google Drive. This allows the creation of many automated tasks that would not be possible otherwise.

FM-API.com is a web service to receive and process webhooks from third-party services. Webhooks provide a way for service provides to 'push' status updates to the end user. Just like IMAP email is pushed to the user instead of the user always have to check to see if mail has come in like they do with POP email. Receiving webhooks and getting them to a FileMaker database can be complicated. FM-API provides this ability service provides both connects to each third-party service to receive their webhooks and then connects to the database directly to pass on the webhook in a FileMaker friendly matter. It does this by creating a user account on the database. This allows FM-API to insert incoming status reports form the different services directly into the database itself.

Figure 5:
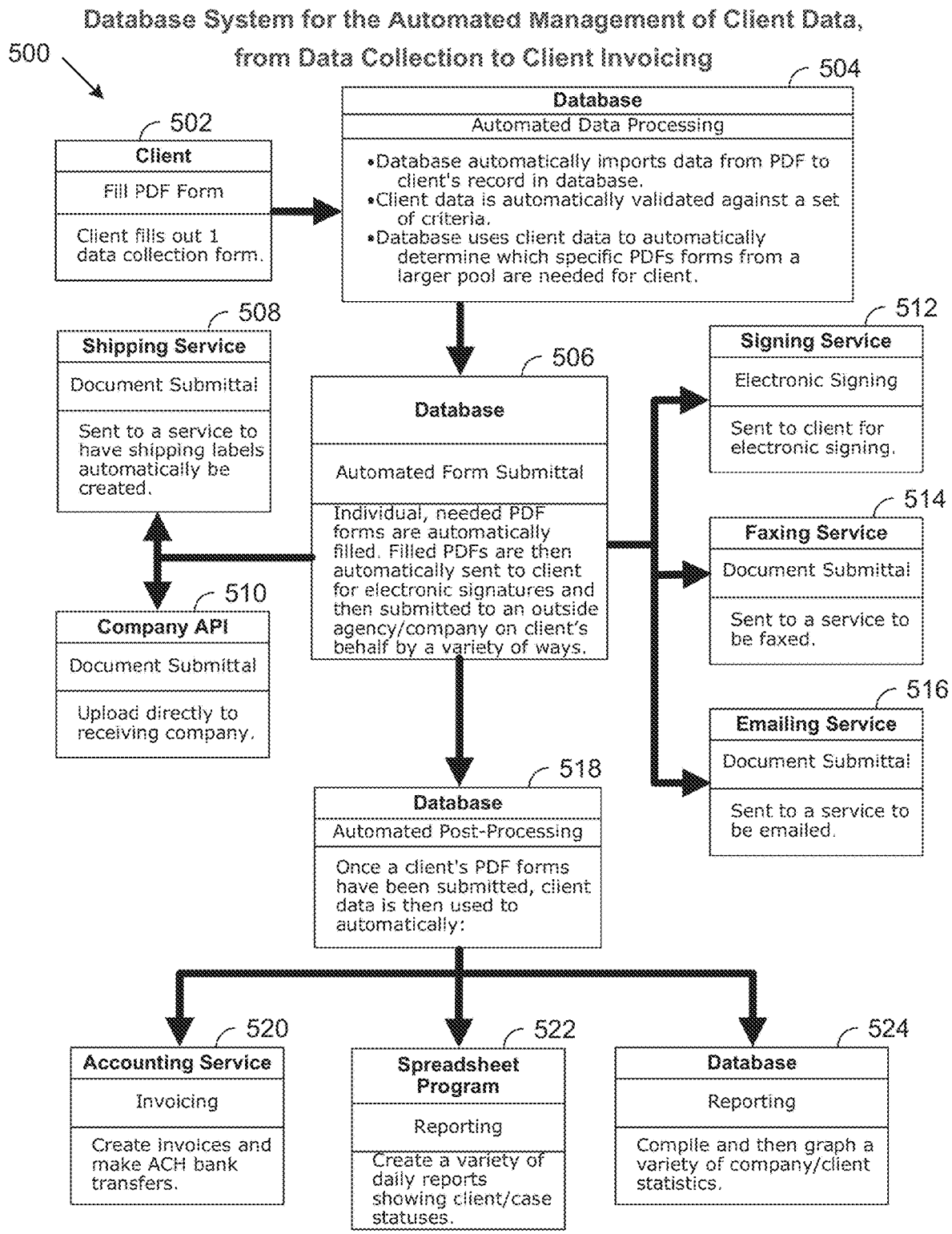
FIG. 5 illustrates a system for automated management of client data from data collection to client invoicing in accordance with aspects of the present disclosure.

FIG. 5 illustrates a system 500 for automated management of client data from data collection to client invoicing in accordance with aspects of the disclosure. At 502, a client can fill out a PDF (portable document format) with client data at a client system.

At 504, a database may automatically import the client data from the PDF to a client's record in the database. The database may automatically validate the client data against a set of criteria. The database may use client data to automatically determine which specific PDF forms from a larger pool are needed for the client.

At 506, the database may perform automated form submittal by automatically filling out individual required PDFs. The database may automatically send the PDFs to the client for electronic signatures and then submits the signed PDFs to an outside agency/company. At 508, documents may be submitted via a shipping service by automatically having shipping labels created. At 510, documents may be automatically submitted to a receiving company via a company AI. At 512, documents may be sent to a client via a signing service for electronic signing. At 514, documents may be sent to be submitted by fax via a faxing service. At 516, documents may be submitted by email through an e-mail service.

At 518, the database may perform post-processing. At 520, an accounting service may create invoices and make bank transfers (e.g. automatic clearing house (ACH) transfers). At 522, a spreadsheet program may create a report showing client or case statuses. At 524, the database may compile a graph of company/client statistics.

Figure 6:
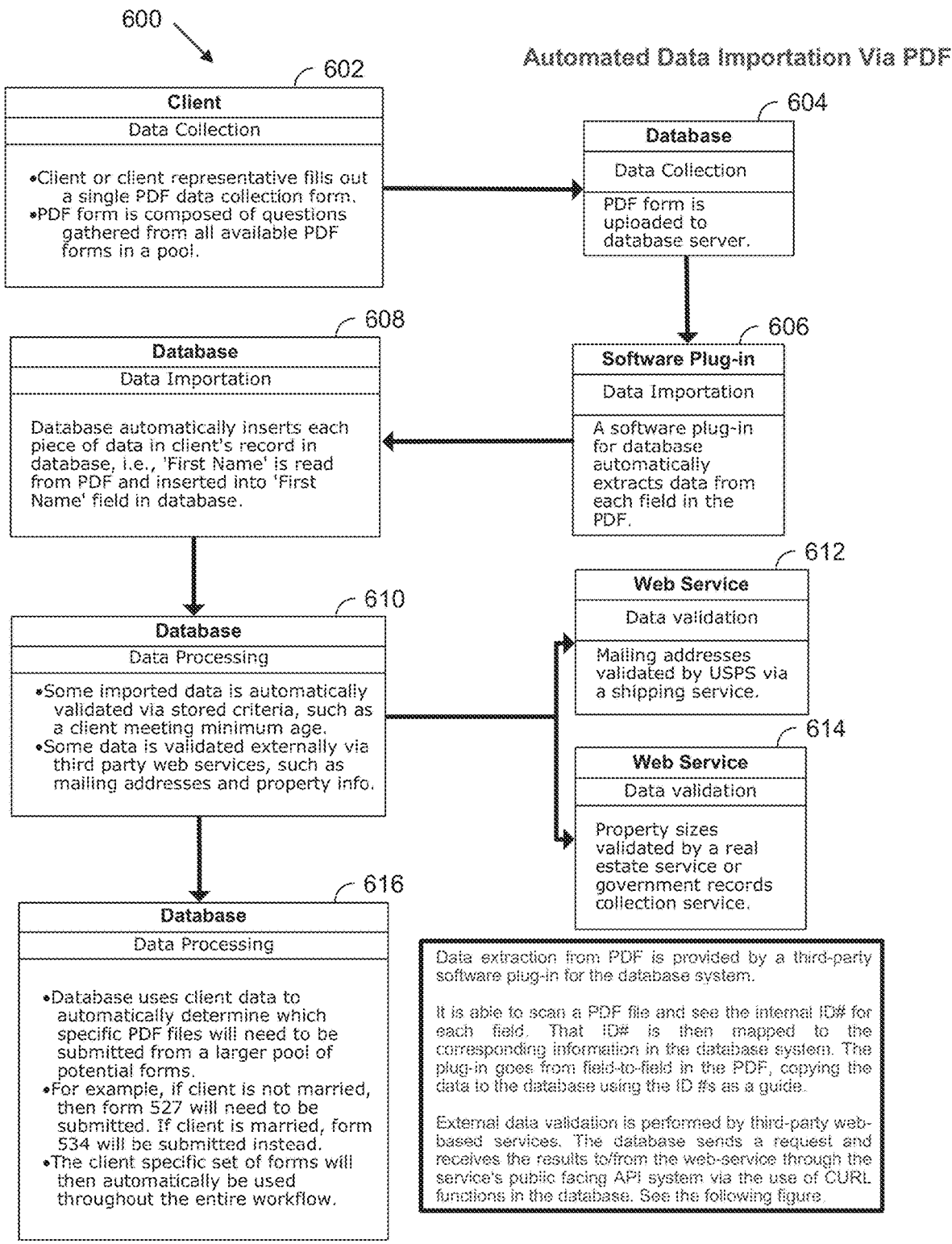
FIG. 6 illustrates system for automated data importation via PDF in accordance with aspects of the present disclosure.

FIG. 6 illustrates system 600 for automated data importation via PDF in accordance with aspects of the disclosure. At 602, a client may fill out a first PDF with client data at a client system. The first PDF may be composed of questions gathered from multiple available PDF forms.

At 604, first PDF may be uploaded to a database server.

At 606, a software plug-in may be used to automatically extract data from each field in the first PDF. Data extraction from PDF may be provided by a third-party software plug-in for the database system.

At 608, the database may automatically take the information extracted at 606 and inserts it into the client's record in the database system. As an example, a "first name" may be read from the first PDF and may be inserted into a "first name" field in the database.

At 610, a portion of the imported data may be automatically checked against a list of criteria needed for a particular use. For example, it may check the age to make sure it meets a minimum age requirement or check to make sure the client's income does not go over the maximum allowed income for a certain government program. If any piece of information fails to meet all the criteria, the user is alerted. Another portion of the data may be validated by third party web services (e.g. mailing addresses and property information). These third-party services may offer access to public records. External data validation may be performed by third-party web-based services wherein the database sends a request to and receives the results from the web-service through the service's public facing API system via the use of CURL functions in the database. At 612, a web service may perform validation of mailing addresses via a shipping service. At 614, a web service may validate property sizes by using a real estate service or government records collection service.

At 616, the database may use client data to automatically determine which set of client specific PDF files will need to be submitted from a larger pool of potential forms. For example, if the client is married, form 527 may need to be submitted, while if the client is not married, form 534 may need to be submitted instead. The set of client specific PDF files may then be used for later processes.

Figure 7:
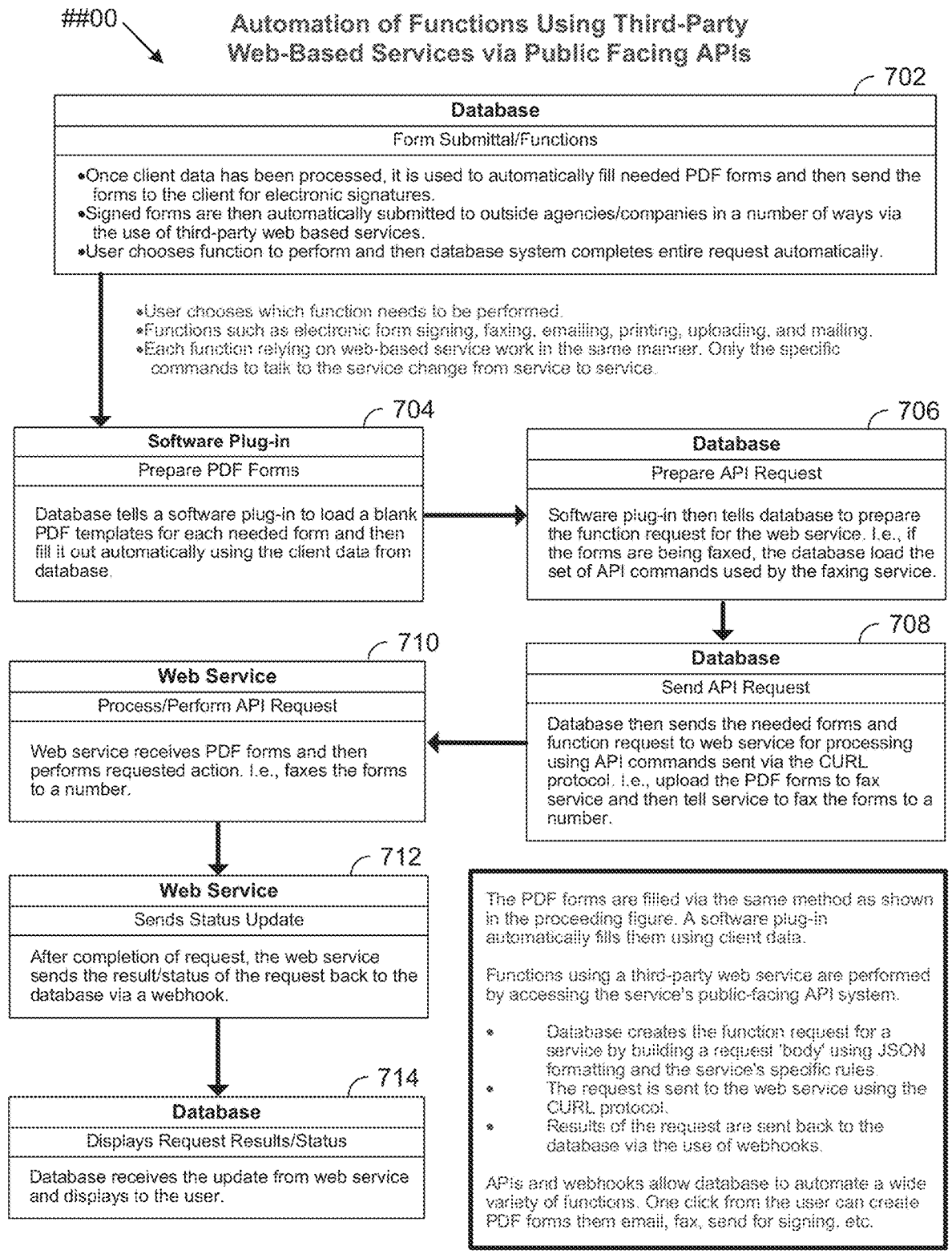
FIG. 7 illustrates automation of functions using third-party web-based services via public facing APIs in accordance with aspects of the present disclosure.

FIG. 7 illustrates automation of functions using third-party web-based services via public facing APIs 700 in accordance with aspects of the disclosure. At 702, once client data has been processed, it may be used to automatically fill PDF forms and send those forms to the client for electronic signatures. The PDF forms are filled via the same method as shown in the proceeding figure. A software plug-in automatically fills them using client data. Signed forms may then be automatically submitted to outside agencies/companies in a number of ways via the use of third-party web-based services. A user may choose which function needs to be performed, and the system may complete the request automatically.

At 704, one or more software plug-ins may prepare PDF forms. The system may direct the one or more software plug-ins to load blank PDF templates for needed forms and may then fill the one or more forms out automatically using the client data from the database.

At 706, software plugins in the database may prepare an API request for web services. The API requests may be created by building a request 'body' using JSON formatting and the service's specific rules.

At 708, the forms and the API request may be transmitted (i.e., if the forms are being faxed, the database loads the set of API commands used by the faxing service). The API request may be sent to the web service using the CURL protocol.

At 710, the web service may receive the forms and performs the requested action (i.e., faxes the forms to a number).

At 712, the web service may send the result(s)/status of the request back to the database via a webhook.

At 714, the result(s)/status may be received by the database and displayed to the user.

Figure 8:
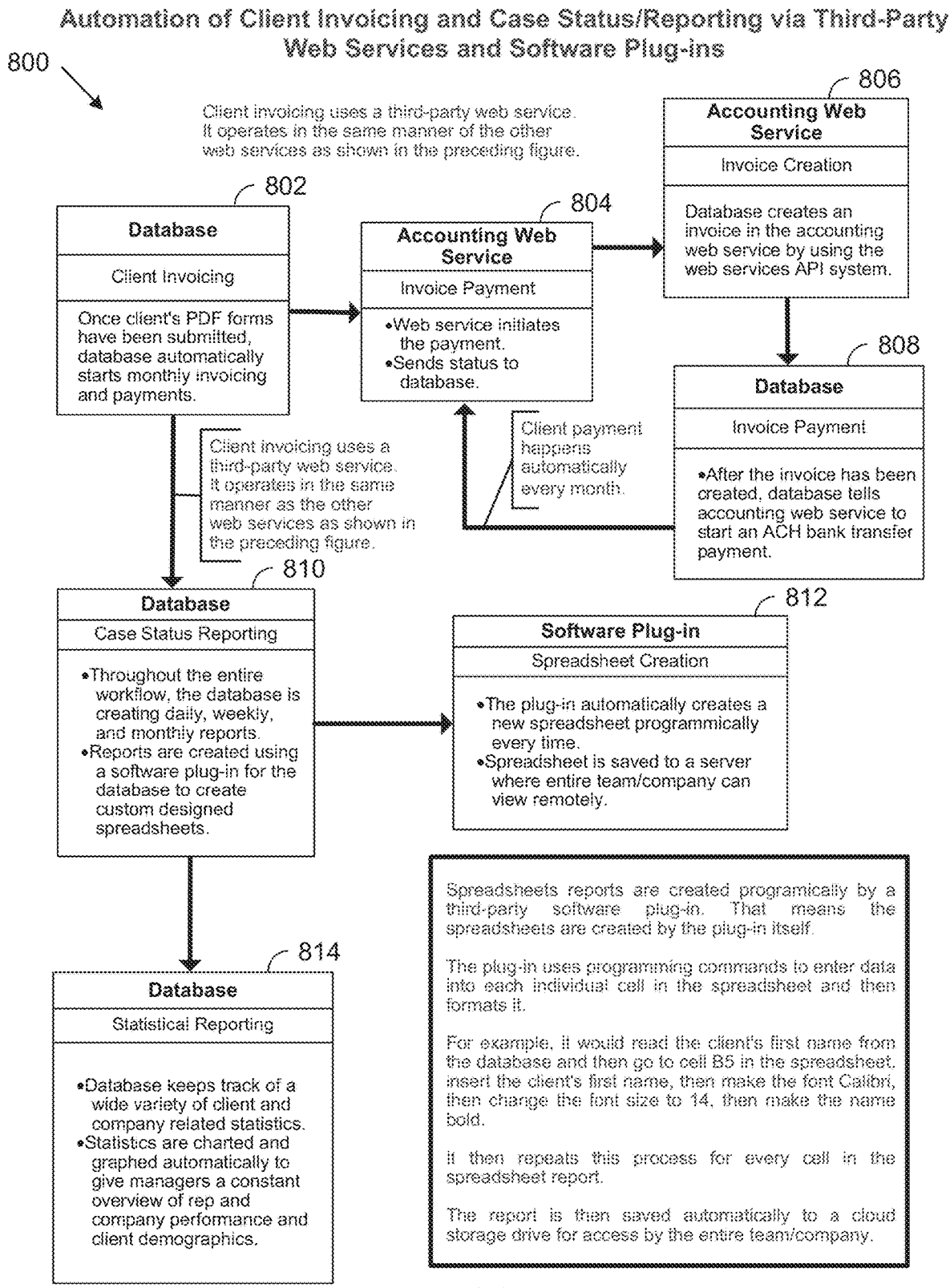
FIG. 8 illustrates automation of client invoicing and case status/reporting via third-party web services and software plug-ins in accordance with aspects of the present disclosure.

FIG. 8 illustrates automation of client invoicing and case status/reporting via third-party web services and software plug-ins 800 in accordance with aspects of the disclosure. At 802, once a client's PDF forms have been submitted, the system may automatically start monthly invoicing and payments. At 804, an accounting web service may receive invoice payments, initiate payment, and send the status to the database. At 806, the accounting web service may create invoices in the accounting web service by using the web service's API system. At 808, the database may cause the accounting web service to start a bank transfer payment. This payment may be automatically made once per month.

At 810, the database may create daily, weekly, or monthly reports. The reports may be created using a software plug-in for the database to create spreadsheets. The plug-in uses programming commands to enter data into each individual cell in the spreadsheet and then formats it. For example, it may read the client's first name from the database and then go to cell B5 in the spreadsheet, insert the client's first name, then make the font Calibri, then change the font size to 14, then make the name bold. It then repeats this process for every cell in the spreadsheet report. This allows each spreadsheet to be custom designed to show the exact information and layout needed by different people/teams in the company. At 812, the plug-in may automatically create a new spreadsheet at each time period. The spreadsheet may be saved to a server where the entire team/company can view remotely.

At 814, the database may perform statistical reporting. The database may keep track of a wide variety of client- and company-related statistics. The statistics may be charted and graphed automatically to give managers a constant overview of company performance and client demographics.

FIGS. 9-16 show a general workflow for automated management of client data in accordance with aspects of the disclosure.

Figure 9:
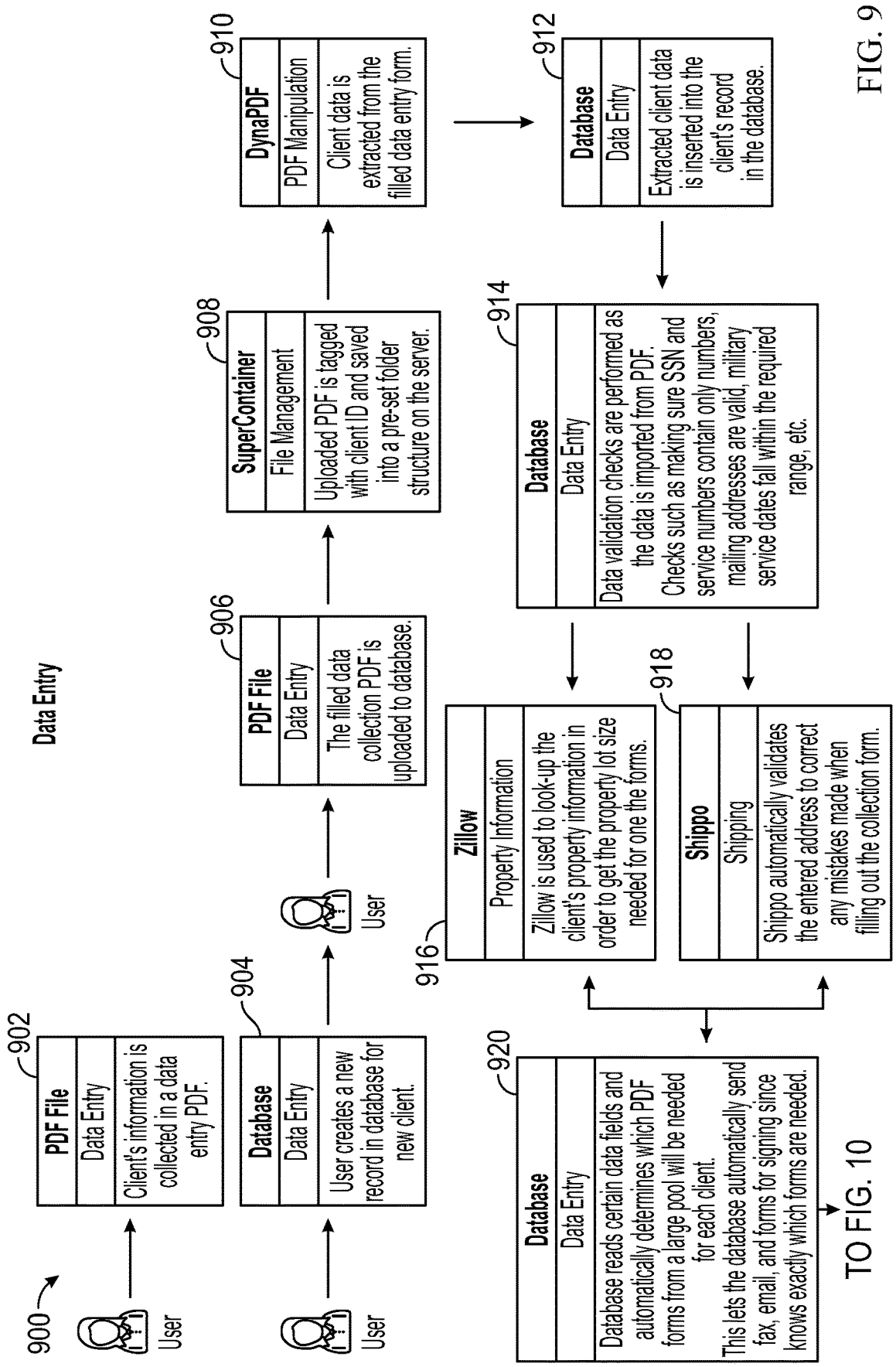
FIG. 9 illustrates a data entry workflow in accordance with aspects of the present disclosure.

FIG. 9 shows a data entry workflow 900. At 902, a new client's data may be collected in a data entry PDF. At 904, a user may create a new record in a database for the new client. At 906, the filled data collection PDF may be uploaded to the database. At 908, the uploaded PDF may be tagged with a client ID and saved into a pre-set folder structure on the server. At 910, client data may be extracted from the filled data entry form. At 912, extracted client data may be inserted into the client's record in the database. At 914, the inputted client data can be checked for data entry errors, checked predetermined criteria, or validated by accessing public records. Data error checks ensure certain fields do not have typing mistakes like making sure SSNs have 9 numbers and no letters, dates adhere to the mm-dd-yyyy format, etc. Criteria checks may involve making sure certain requirements are met like income, age, employment status, etc. Client data that can be found in public records can be validated by the use of various third-party web services. At 916, Zillow may be used to look up the client's property information in order to get the property lot size needed for one of the forms. At 918, Shippo may automatically validate the entered address to correct any mistakes made when filling out the data collection form. At 920, the database may read certain data fields and automatically determine which PDF forms from a large pool will be needed for each client. This allows the database to automatically send fax, e-mail, and forms for signing.

Figure 10:
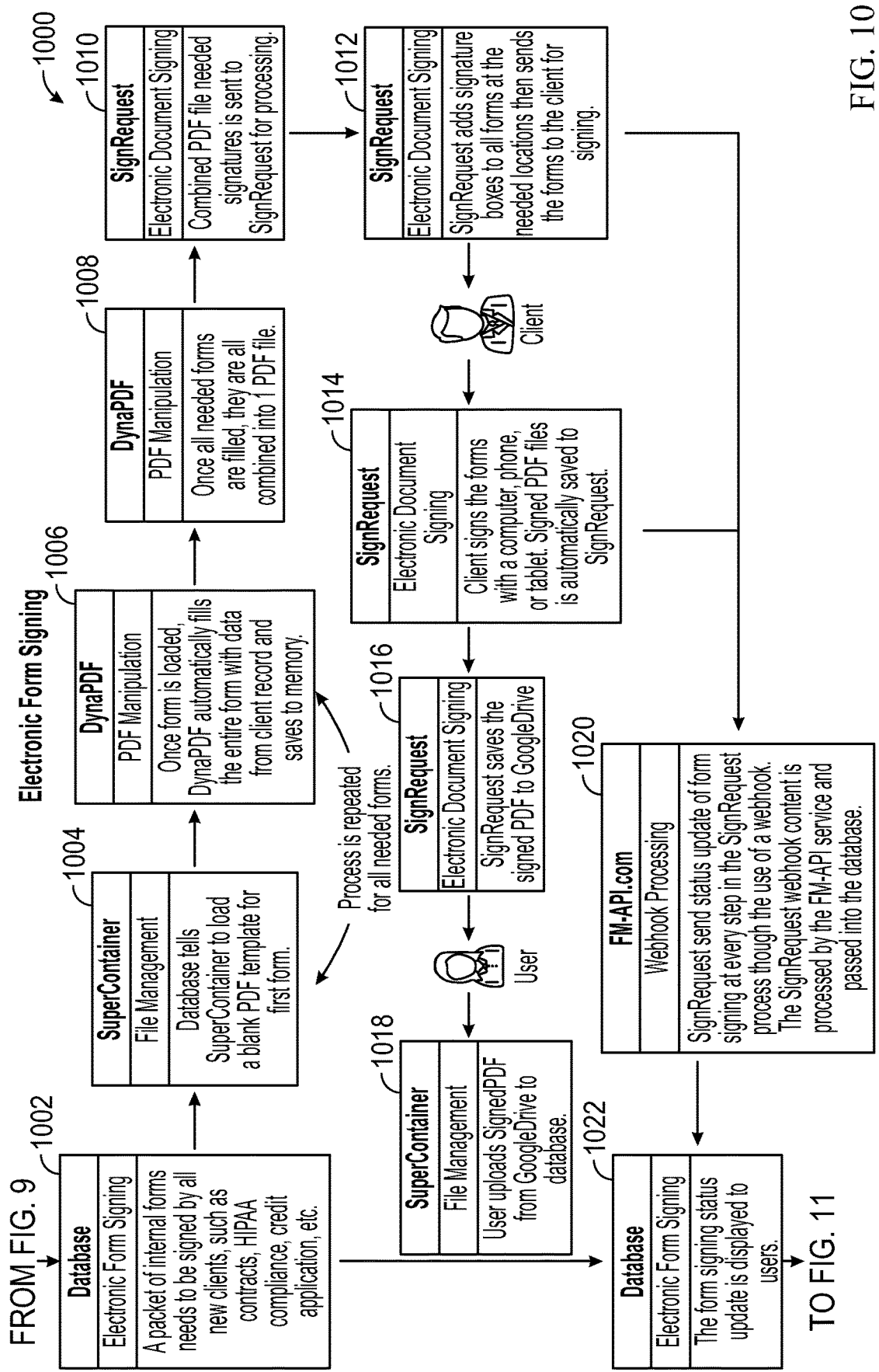
FIG. 10 illustrates an electronic form signing workflow in accordance with aspects of the present disclosure.

FIG. 10 shows an electronic form signing workflow 1000. At 1002, a packet of internal forms may need to be signed by new clients. These forms may include contracts, HIPAA compliance forms, credit applications, etc. At 1004, the database may request SuperContainer to load a blank PDF template for a first form. At 1006, once the first form is loaded, DynaPDF may automatically fill the form with data from client records saved to memory. At 1008, once all required forms are filled, the required forms may be combined into one PDF file. At 1010, the combined PDF file needing signatures may be sent to SignRequest for processing. At 1012, SignRequest may add signature boxes to all forms at the needed locations. The forms may then be sent to the client for signing. At 1014, the client may sign the forms with a computer, phone, or tablet. Signed PDF files may be automatically saved to SignRequest. At 1016, SignRequest may save the signed PDF to Google Drive. At 1018, the user may upload the signed PDF from Google Drive to the database. At 1020, SignRequest may send a status update of form signing at one or more steps in the SignRequest process through the use of a webhook. The SignRequest content may be processed by the FM-API service and passed into the database. At 1022, the form signing status may be displayed to users.

Figure 11:
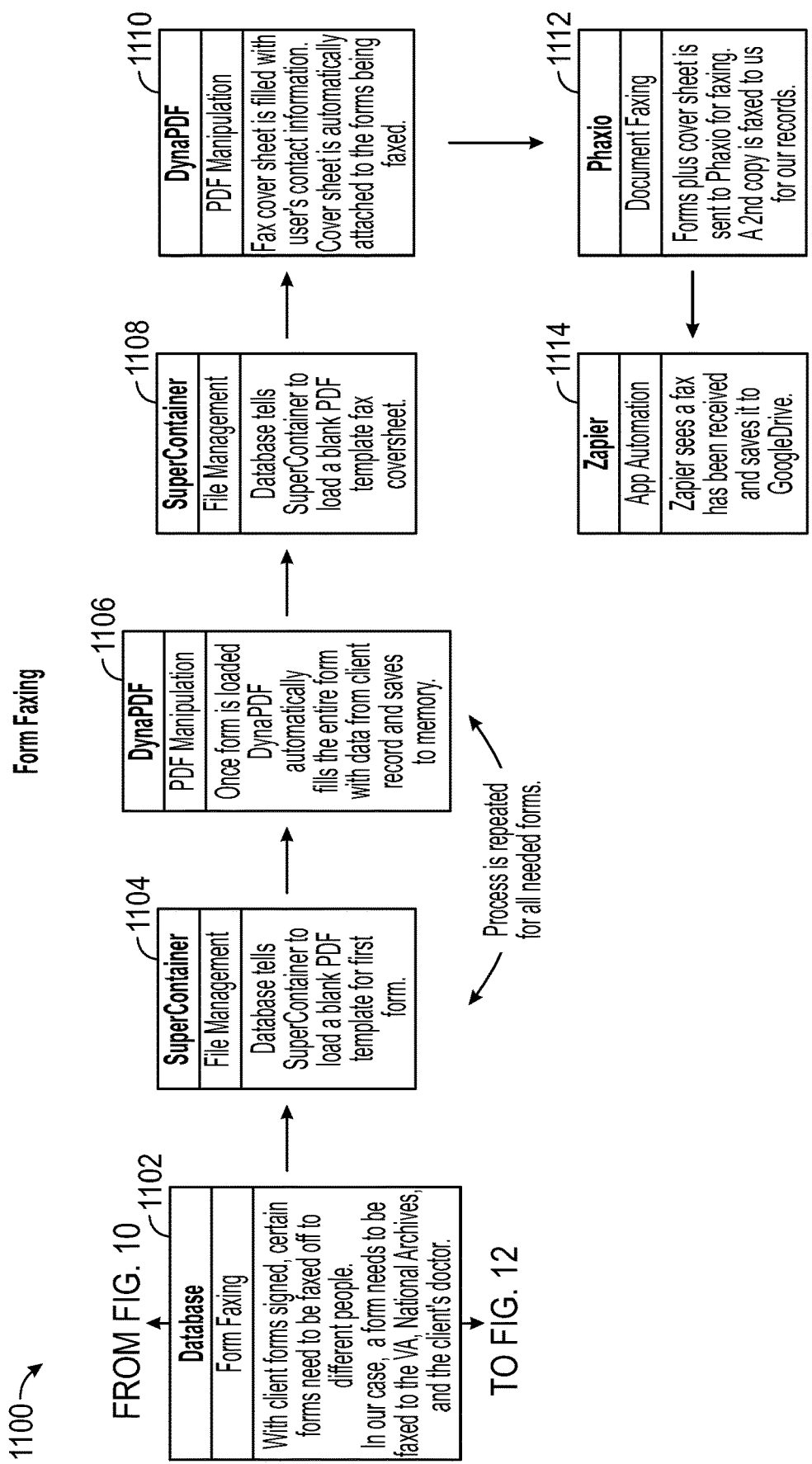
FIG. 11 illustrates a form faxing workflow in accordance with aspects of the present disclosure.

FIG. 11 shows a form faxing workflow 1100. At 1102, with the client forms, certain forms may need to be faxed to different people or locations. In some cases, the forms may need to be signed. In some cases, a form may need to be faxed to the VA, National Archives, or the client's doctor. At 1104, if the forms do not need to be signed, the database may direct SuperContainer to load a blank PDF for a first form. At 1106, once the form is loaded, DynaPDF may automatically fill the entire form with data from client records saved to memory. This process may be repeated for all needed forms. If the forms have been signed already, SuperContainer may instead load the signed copy of the form. At 1108, the database may tell SuperContainer to load a blank PDF template fax coversheet. At 1110, the fax cover sheet may be filled with the user's contact information. The cover sheet may be automatically attached to the forms being faxed. At 1112, the forms and the cover sheet may be sent to Phaxio for faxing. A second copy may be faxed to another location for maintenance of records. At 1114, Zapier may detect that a fax has been received and save the fax to Google Drive.

Figure 12:
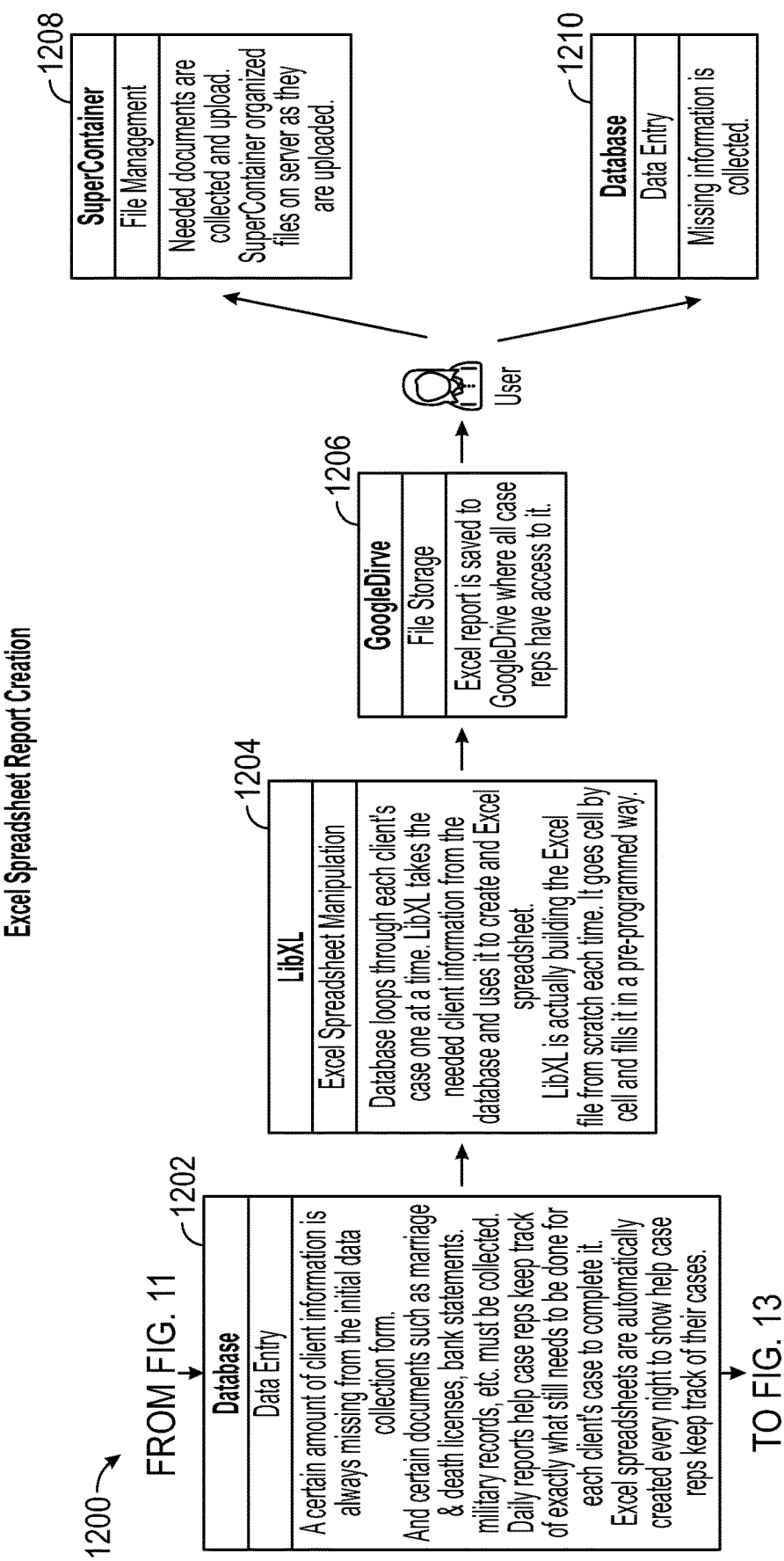
FIG. 12 illustrates an excel spreadsheet report creation workflow in accordance with aspects of the present disclosure.

FIG. 12 shows an excel spreadsheet report creation workflow 1200. At 1202, a portion of client information may be missing from the initial data collection form and certain documents, such as marriage licenses and death certificates, bank statements, military records, etc. may need to be collected. Daily reports may help keep track of exactly what still needs to be done for each client's case. Excel spreadsheets may be automatically created every night to show case representatives and managers the case status for each client in order to ensure each case is meeting all company deadlines. At 1204, the database may loop through each client's case one at a time. LibXL may take the needed client information from the database and may use it to create an Excel spreadsheet. LibXL may build the Excel file from scratch each time. LibXL may fill in the cells one-by-one in a pre-programmed fashion. At 1206, the Excel spreadsheet may be saved to Google Drive, where one or more case representatives may have access to it. At 1208, required documents may be collected and uploaded. SuperContainer may organize files on the server as they are uploaded. At 1210, missing information may be collected.

Figure 13:
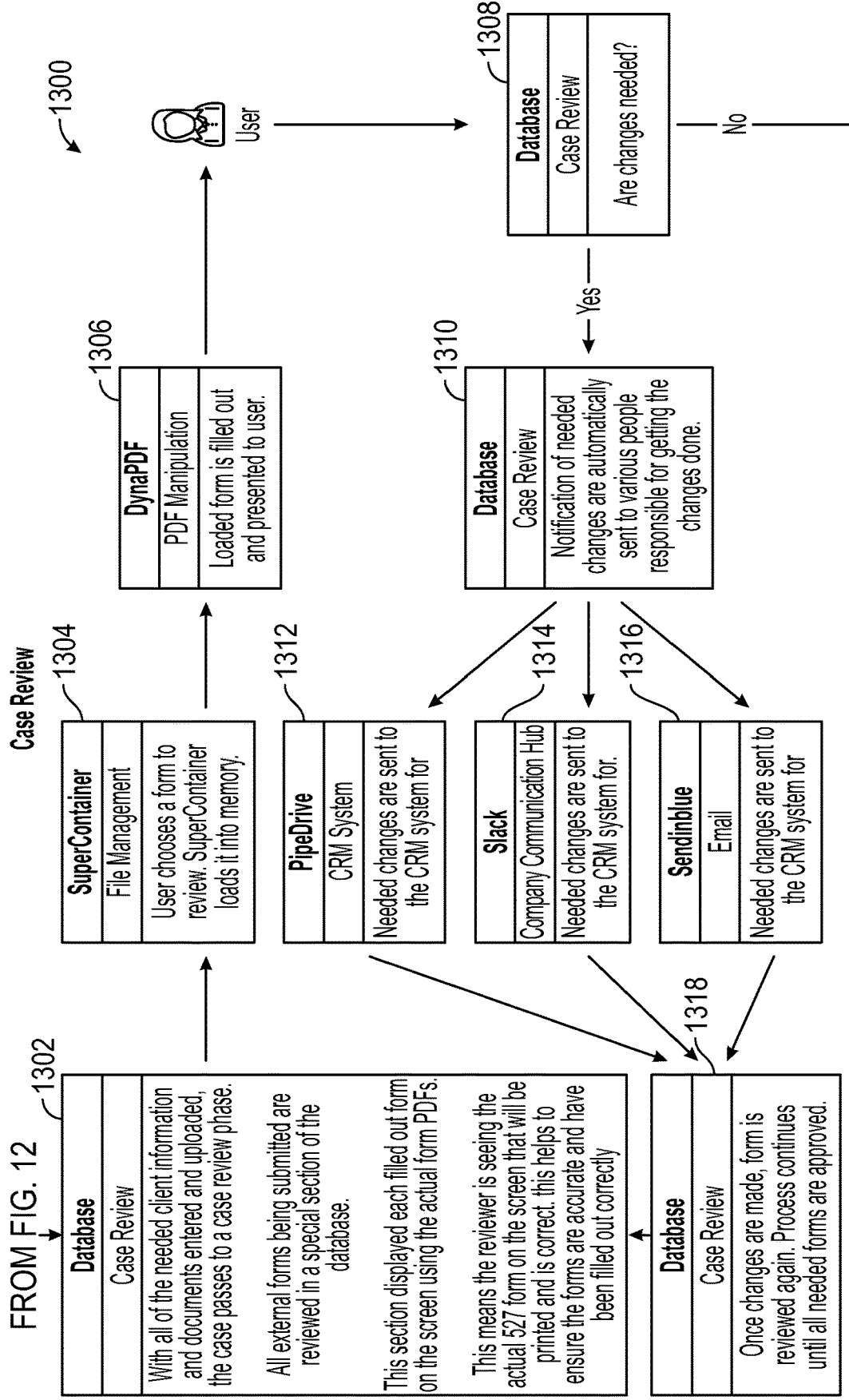
FIG. 13 illustrates a case review workflow in accordance with aspects of the present disclosure.

FIG. 13 shows a case review workflow 1300. At 1302, with the required client information entered and documents uploaded, the case may pass to a case review phase. External forms submitted may be reviewed in a special section of the database. This section may display each filled out form on the screen using actual form PDFs, meaning that a reviewer is seeing the actual 527 form on the screen that will be printed and submitted. The reviewer may then lock the file if it is correct. This may help to ensure the form is accurate and have been filled out correctly. At 1304, the user may choose a form to review, and SuperContainer load it into memory. At 1306, the loaded form may be filled out and presented to the user. At 1308, a determination may be made as to whether changes are needed. At 1310, if changes are needed, notifications of needed changes may be automatically sent to persons/entities responsible to performing required changes. At 1312, needed changes may be sent to the CRM system, such as PipeDrive, to alert the customer service representative to call client to collect missing items or make changes. At 1314, needed changes may also be sent to a company's communication platform, such as Slack, where teams or individuals may be alerted to issues/problems with cases. At 1316, needed changes may be sent to individuals or team members via e-mail using Sendinblue. At 1318, once changes have been made, the form may be reviewed again. This process may continue until all needed forms are approved.

Figure 14:
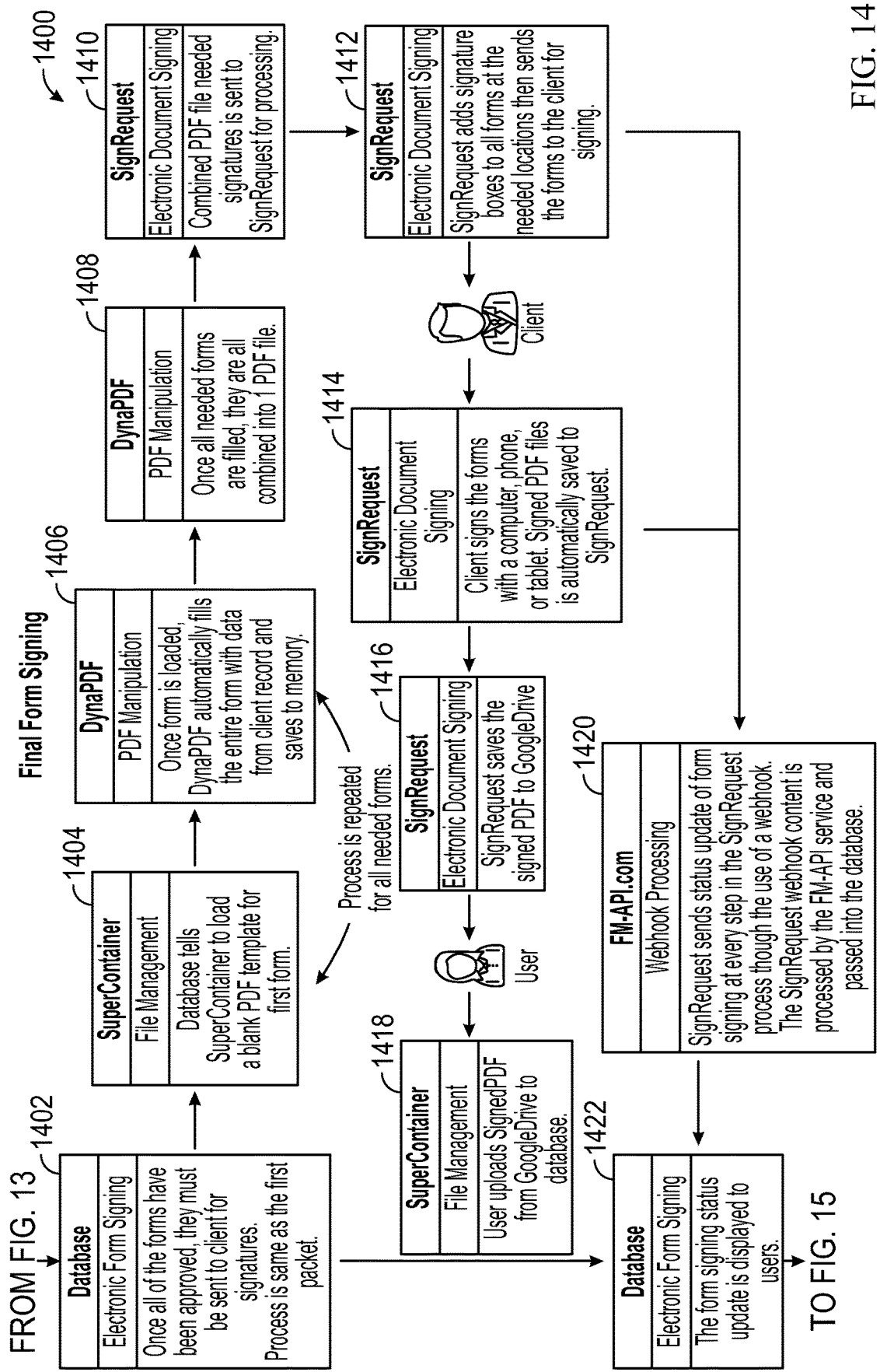
FIG. 14 illustrates a final form signing workflow in accordance with aspects of the present disclosure.

FIG. 14 shows a final form signing workflow 1400. At 1402, once all of the forms have been approved, the forms may be sent to clients for signatures. At 1404, the database tells SuperContainer to load a blank PDF template for a first form. At 1406, once the first form is loaded, DynaPDF may automatically fill the entire form with data from client records saved to memory. This process may be repeated for one or more needed forms. At 1408, once all needed forms are filled, the needed forms may be combined into one PDF file. At 1410, the combined PDF file needing signatures may be sent to SignRequest for processing. At 1412, SignRequest may add signature boxes to all forms at needed locations and may send those forms to the client for signing. At 1414, the client may sign the forms with a computer, phone, tablet, or other suitable device. Signed PDF files may be automatically saved to SignRequest. At 1416, SignRequest may save the signed PDF to Google Drive. At 1418, the user may upload the signed PDF from Google Drive to the database. At 1420, SignRequest may send status updates at one or more steps of the SignRequest process through the use of a webhook. The SignRequest webhook content may be processed by the FM-API service and passed into the database. At 1422, the form signing status update may be displayed to users.

Figure 15:
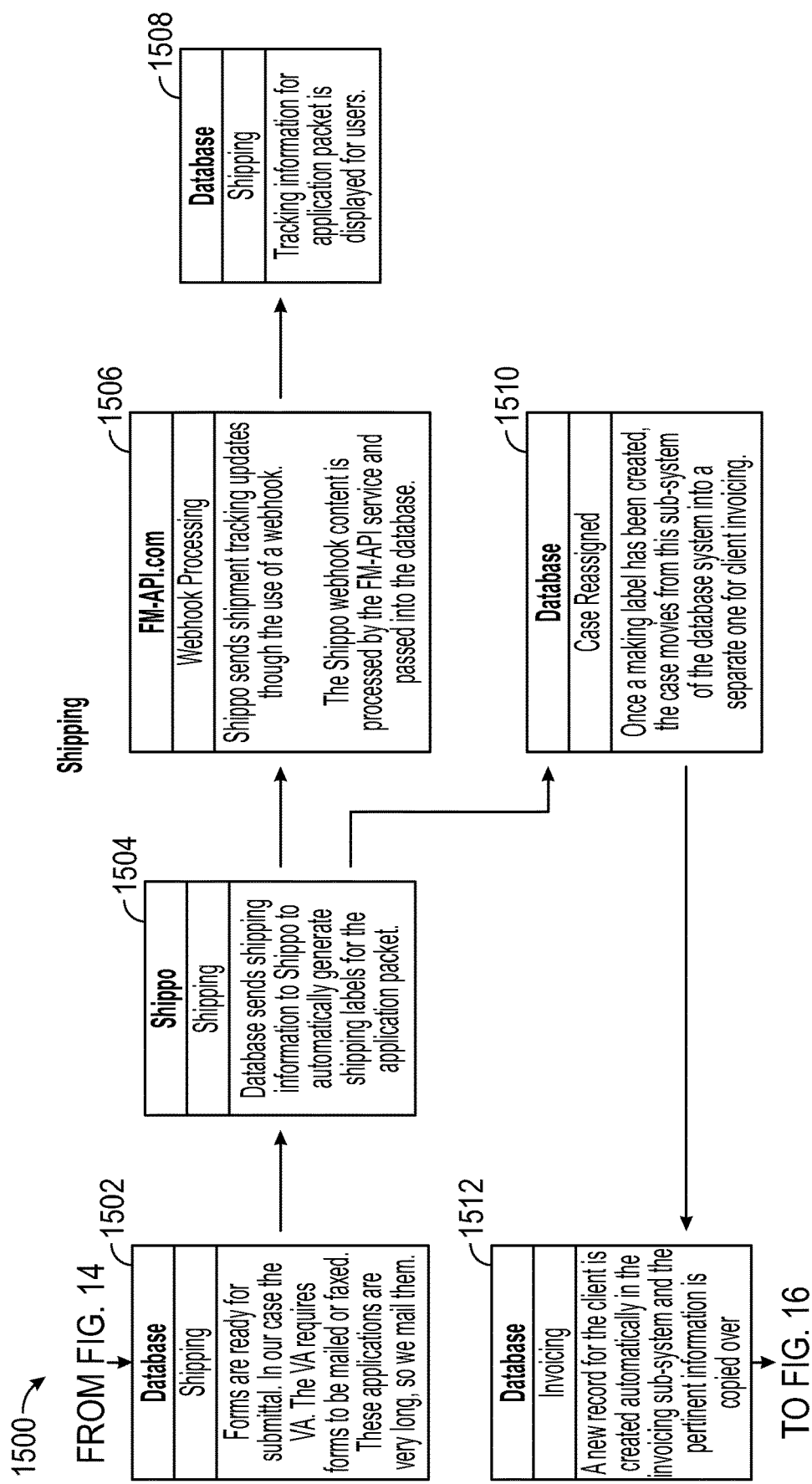
FIG. 15 illustrates a shipping workflow in accordance with aspects of the present disclosure.

FIG. 15 shows a shipping workflow 1500. At 1502, forms are ready for submittal. Form may be submitted by to an outside company or agency by mail, fax, email, FTP, or by the use of a company's API system. Faxing, emailing, and uploading follow the same processes as described above. The database automatically collects all of the signed forms and other documents needed for the submission into a single PDF file which is then sent off in the appropriate manner. Application may be long and be necessary to mail instead of faxing (for example, to the VA). Submitting the form packet by physical mail or shipping service, like USPS or FedEx, requires a shipping label to be created. The database may do this by sending shipping information to Shippo to automatically generate shipping labels for the application packet. At 1506, Shippo may send shipment tracking updates through the use of a webhook. The Shippo webhook content may be processed by the FM-API service and may be passed into the database. At 1508, tracking information for the application packet may be displayed for the users. At 1510, once a mailing label has been created, the case may move from this sub-system of the database into a separate one for client invoicing. At 1512, a new record for the client may be created automatically in the invoicing sub-system and the pertinent information may be copied over.

Figure 16:
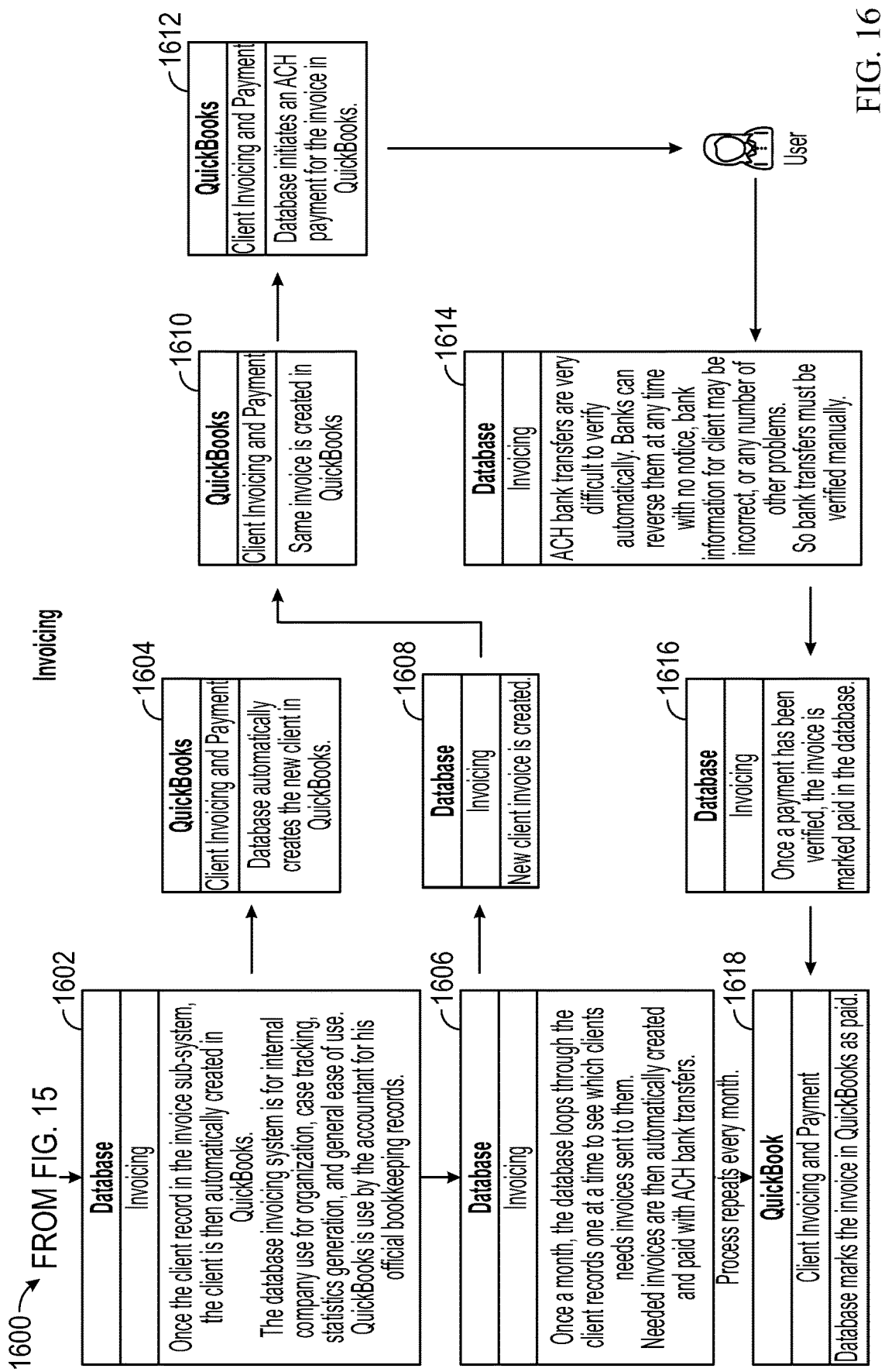
FIG. 16 illustrates an invoicing workflow in accordance with aspects of the present disclosure.

FIG. 16 shows an invoicing workflow 1600. At 1602, once the client record is in the invoice sub-system, a client entry may then automatically created in a third-party accounting software platform such as QuickBooks. The database invoicing system may be for internal company use for organization, case tracking, statistics generation, and general ease of use. An outside service may be needed when interaction with a bank is needed, for example, for ACH transfers or credit card transactions. At 1604, the database may automatically create the new client in QuickBooks. At 1606, the database may loop through the client records one at a time to see which clients need invoices sent to them. Needed invoices may then automatically created and paid with bank transfers. At 1608, a new client invoice may be created in the database. At 1610, the same invoice may be created in QuickBooks. At 1612, the database may initiate a payment for the invoice in QuickBooks. At 1614, bank transfers may be verified manually, as there may be bank transfer problems, such as how banks can reverse them at any time with no notice, bank information for the client may be incorrect, or any number of other problems may occur. At

1616, once a payment has been verified, the invoice may be marked as paid in the database. At 1618, the database may mark the invoice in QuickBooks as paid.

Figure 17:
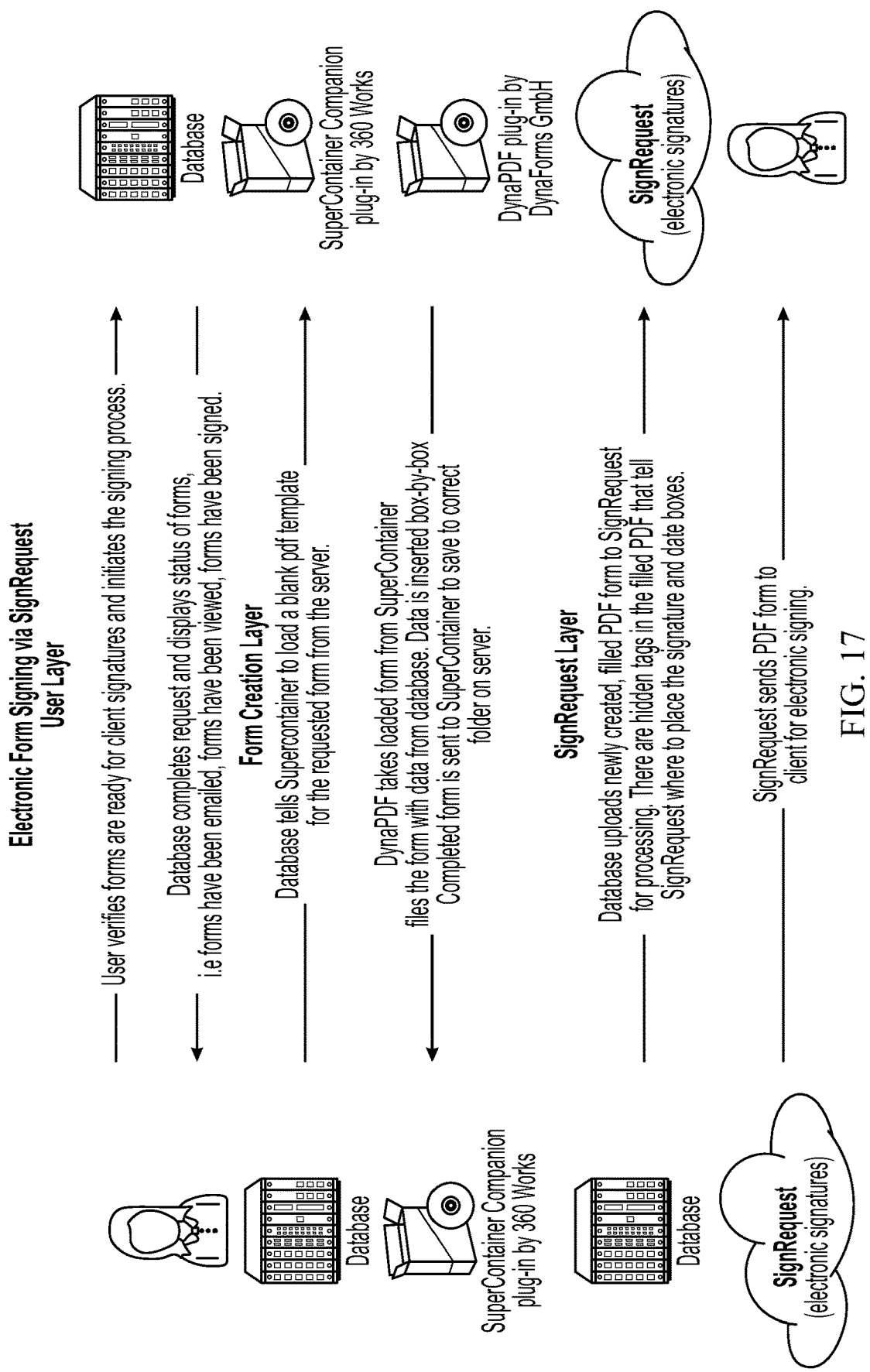
FIGS. 17-18 illustrate methods for electronic form signing via SignRequest.
Figure 18:
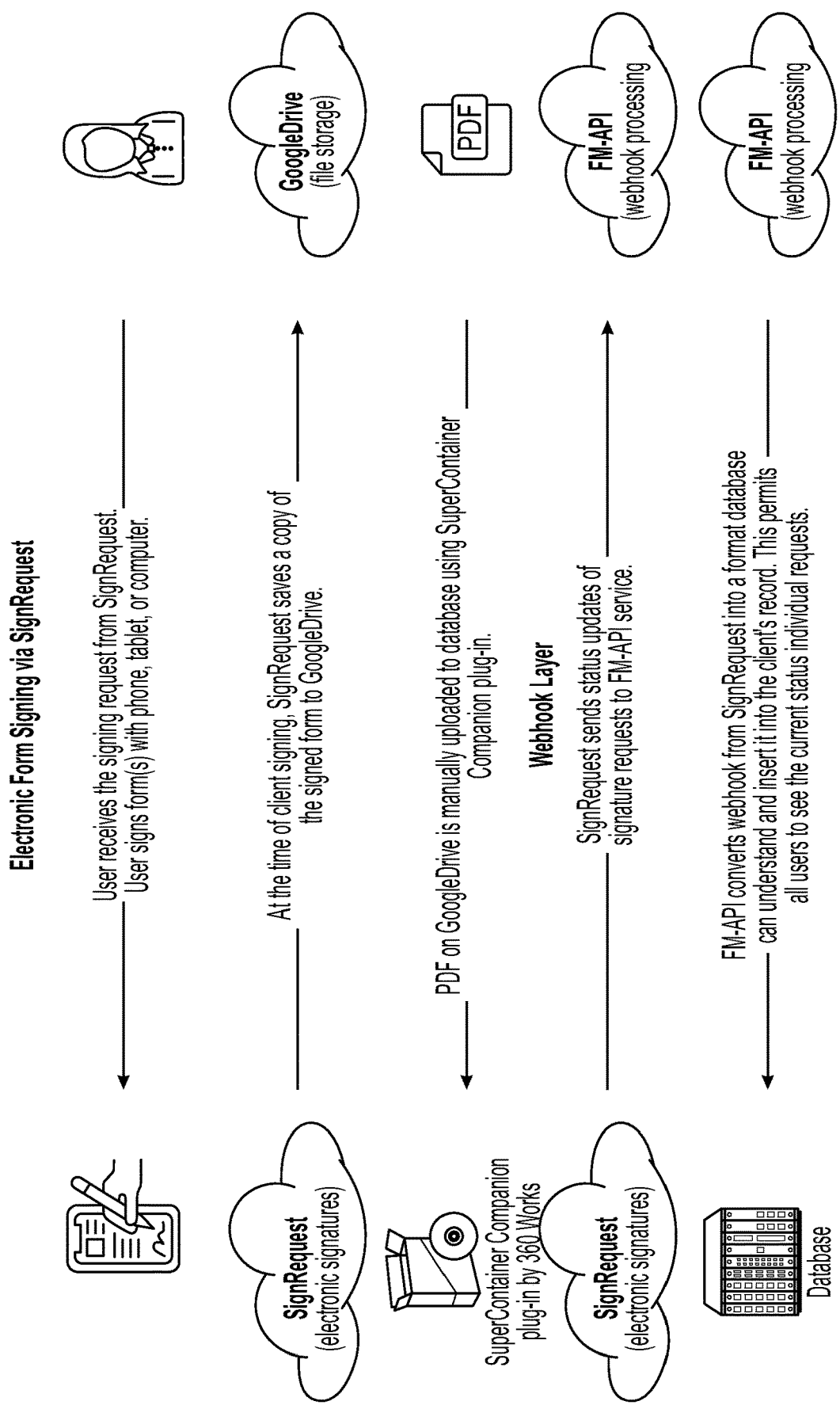

FIGS. 17-18 illustrate electronic form signing via Sign-Request. FIG. 17 shows a user layer in which a user verifies forms may be ready for client signatures and may initiate the signing process. The database may complete the request and display the forms (i.e., forms have been e-mailed, forms have been viewed, forms have been signed).

FIG. 17 shows a form creation layer in which the database may tell SuperContainer to load a blank pdf template for the requested from the server. PDFs may be created using the DynaPDF component for Monkey Bread Software's MBS FileMaker Plugin. Forms may be built using scripts that call functions from the MBS plug-in. Template forms may be filled by the individual boxes using the data from the database. The filled PDF form is uploaded to SignRequest and then automatically sent to the client using a single API call using SignRequest's API endpoint. With DynaPDF for the MBS plug-in, multiple PDF files may be combined into a single file with mostly the same function calls as the form creation process. PDF form fields may be filled by creating a new PDF file with DynaPDF and then filling each field with data from a database. DynaPDF may take the loaded form from Super Container and fill the form with data from the database. Data may be inserted box-by-box. The completed form may be sent to SuperContainer to save to a correct folder on the server.

FIGS. 17-18 shows a SignRequest Layer in which the database uploads newly created, filled PDF forms to Sign-Request for processing. There may be hidden tags in the filled PDF that tell SignRequest where to place the signature and date boxes. SignRequest may send the PDF form to the client for electronic signing. The user may receive the signing request from SignRequest. The user may sign the forms with a phone, tablet, computer, or any other suitable device. At the time of client signing, SignRequest may save a copy of the signed form to Google Drive. The PDF on Google Drive may be manually uploaded to the database using the SuperContainer Companion plugin.

FIG. 18 shows a Webhook Layer in which SignRequest may send status updates of signature requests to the FM-API service. The FM-API may convert the webhook into a format database that can understand and insert into the client's record, permitting one or more users to see the current status of individual requests.

Figure 19:
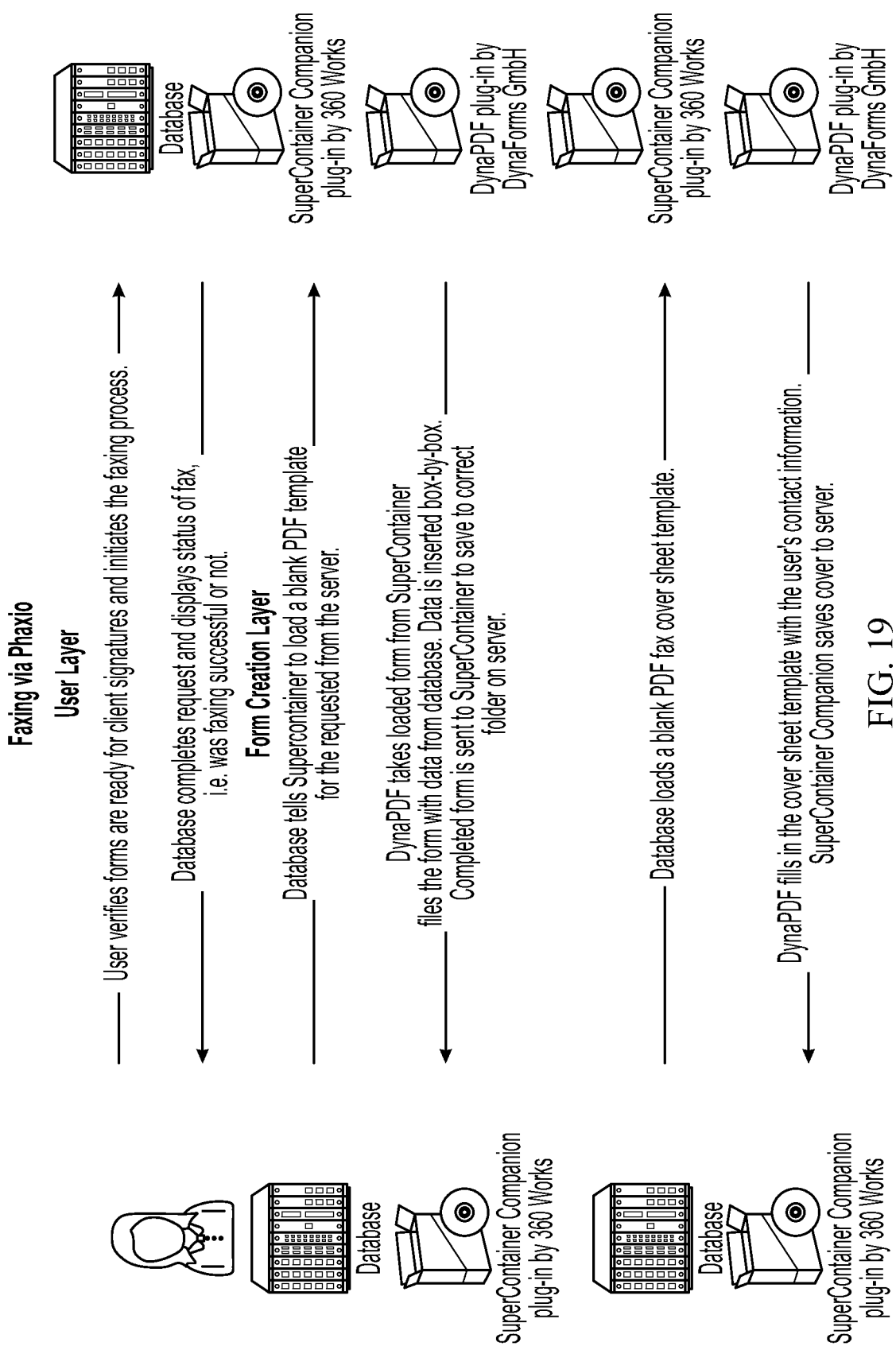
FIGS. 19-21 illustrate methods for faxing forms via Phaxio.
Figure 20:
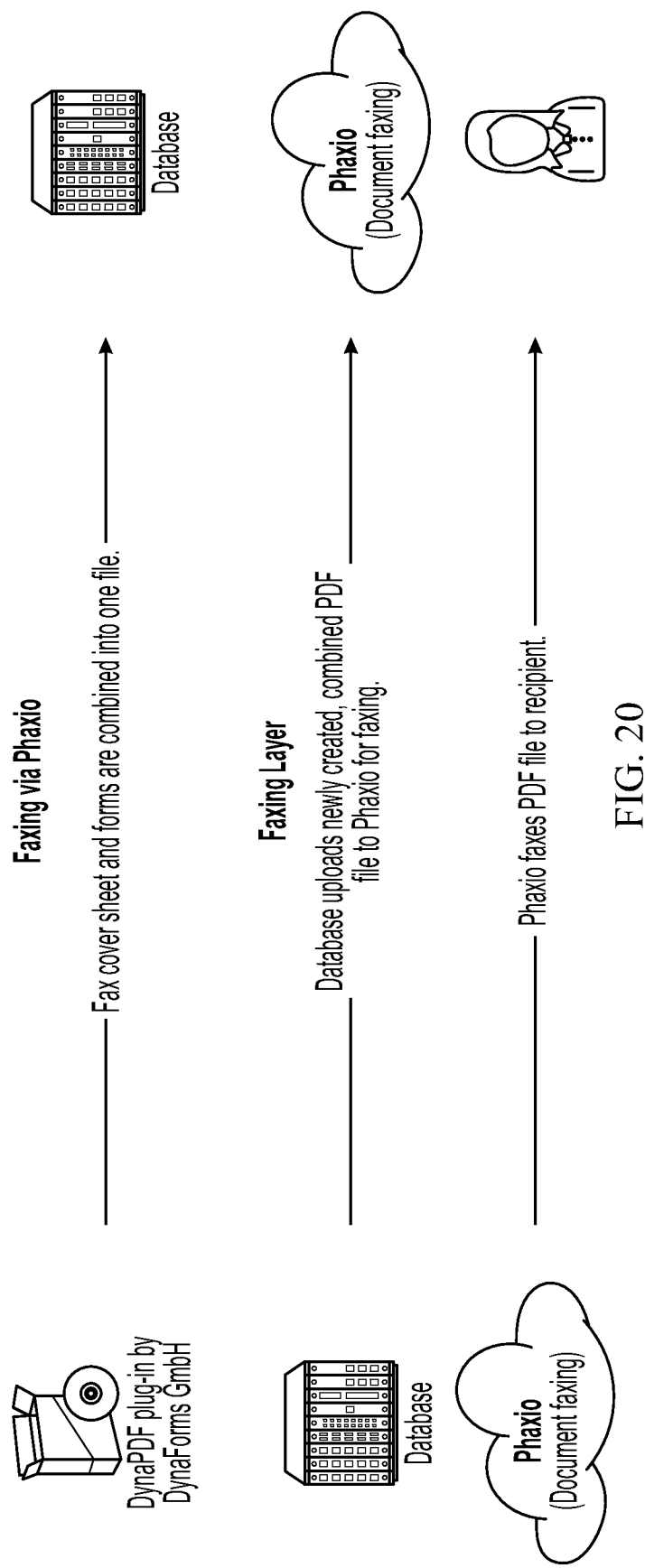
Figure 21:
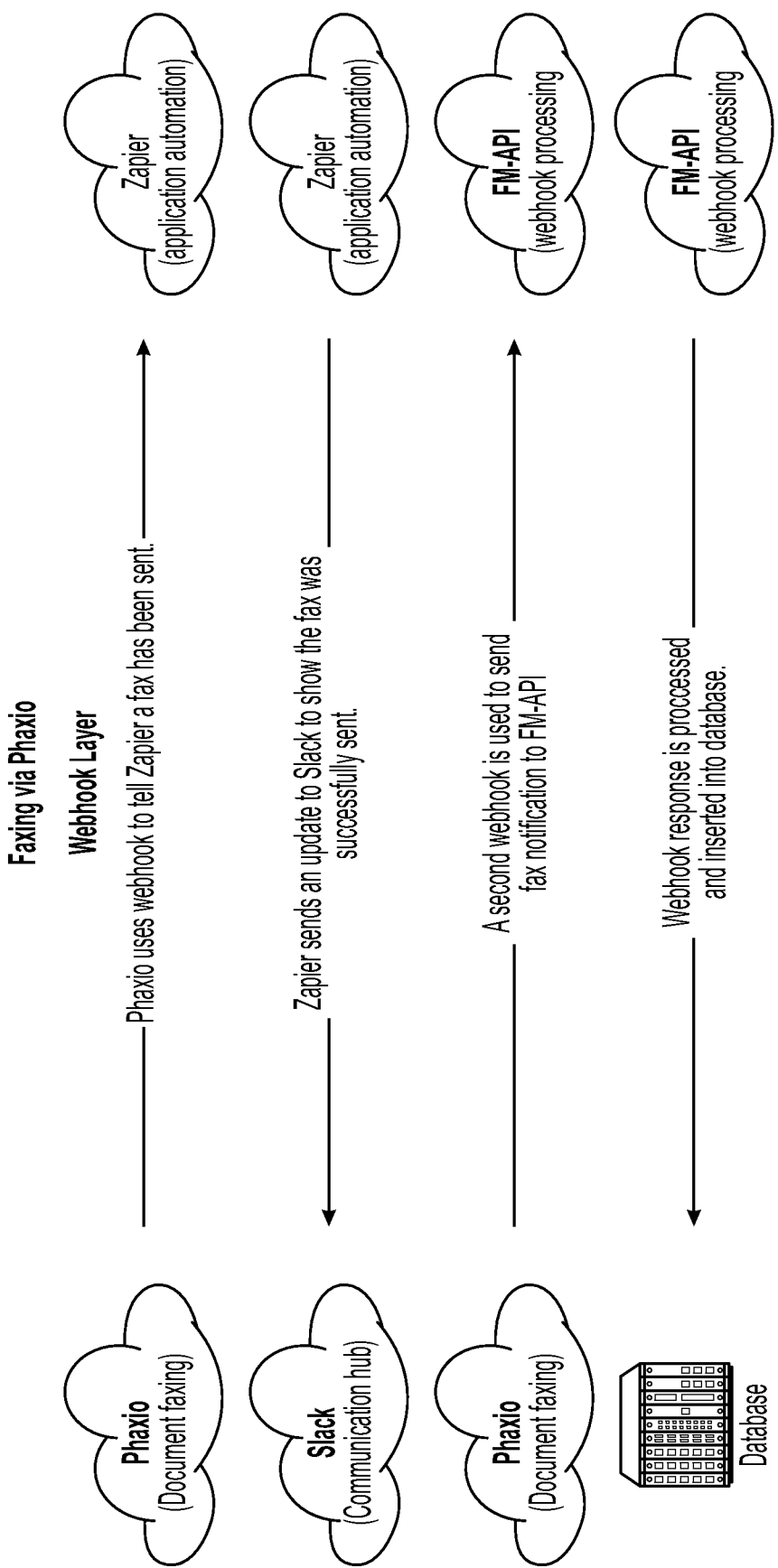

FIGS. 19-21 illustrate Faxing via Phaxio. FIG. 19 shows a User Layer in which the user may verify forms are ready for client signatures and initiates the faxing process. The database may complete the request and display the status of the faxing process (i.e., whether the faxing was successful or not).

FIGS. 19-20 show a Form Creation Layer in which the database may direct SuperContainer to load a blank PDF template for the requested for from the server. DynaPDF may take the blank PDF template from SuperContainer and may fill in the form with data from the database. Data may be inserted box-by-box. The completed form may be sent to SuperContainer to save to a folder on the server. The database may load a blank PDF fax cover sheet template. DynaPDF may fill in the cover sheet template with the user's contact information. SuperContainer Companion may save the cover sheet to the server. The fax cover sheet and forms may be combined into one file.

FIG. 20 shows a Faxing Layer in which the database may upload the newly created, combined PDF file to Phaxio for faxing. Phaxio may fax the PDF file to a recipient. The PDF form may be uploaded to Phaxio and then automatically faxed to the recipient using a single API call using Phaxio's "faxes" API endpoint.

FIG. 21 shows a Webhook Layer in which Phaxio may use a webhook to tell Zapier that a fax has been sent. Zapier may send an update to Slack to show the fax was successfully sent. A second webhook may be used to send an update to FM-API to show the fax was successfully sent. The response(s) to the webhooks may be processed and inserted into the database. Webhooks may be received in database as JSON formatted messages. The individual parts of the message, such as timestamps, ID #'s, signing events, etc. may be extracted for display using FileMaker's built in JSON functions.

Figure 22A:
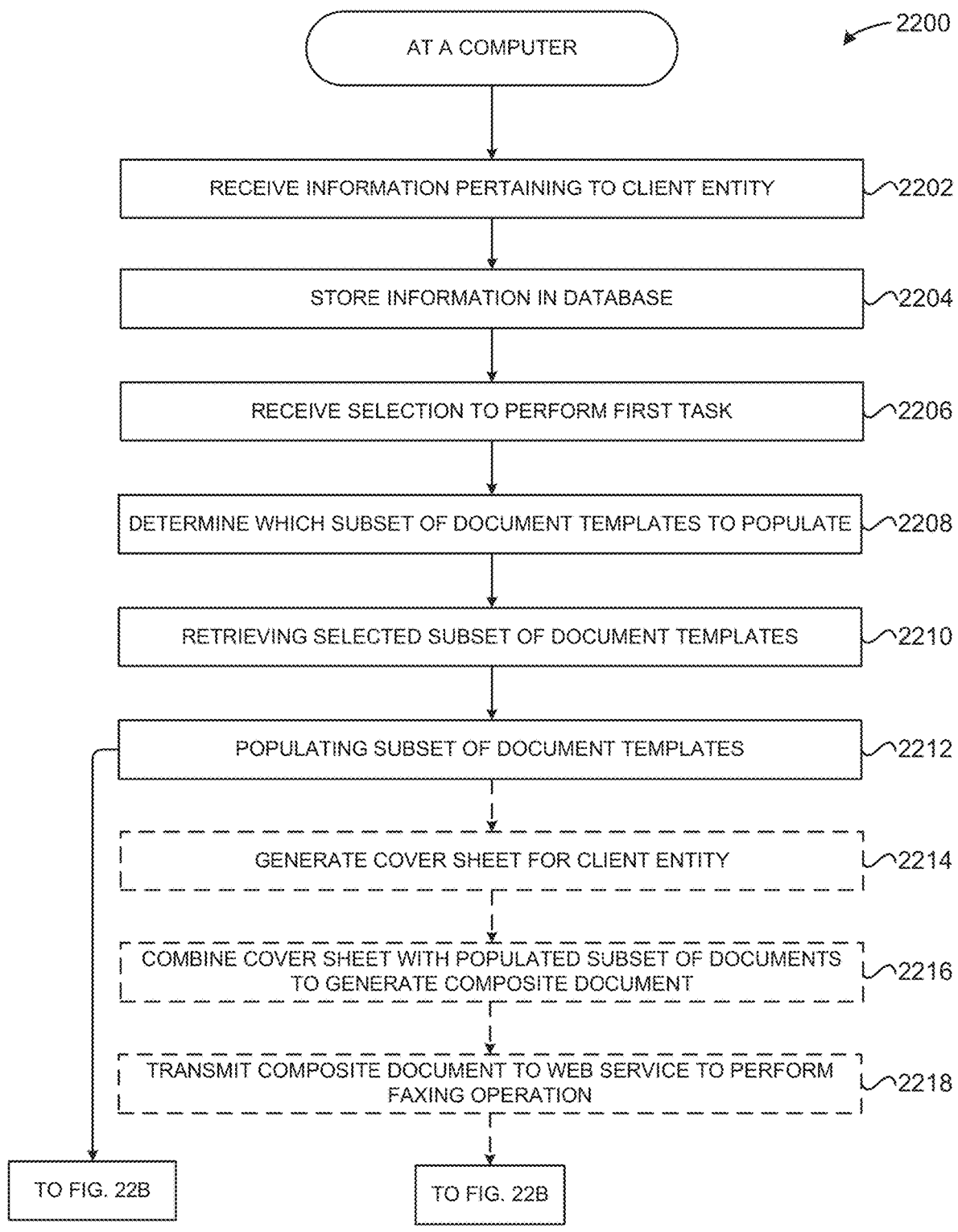
FIGS. 22A-22C illustrate a method 2200 for automated data importation, processing, and form submittal in accordance with aspects of the present disclosure.
Figure 22B:
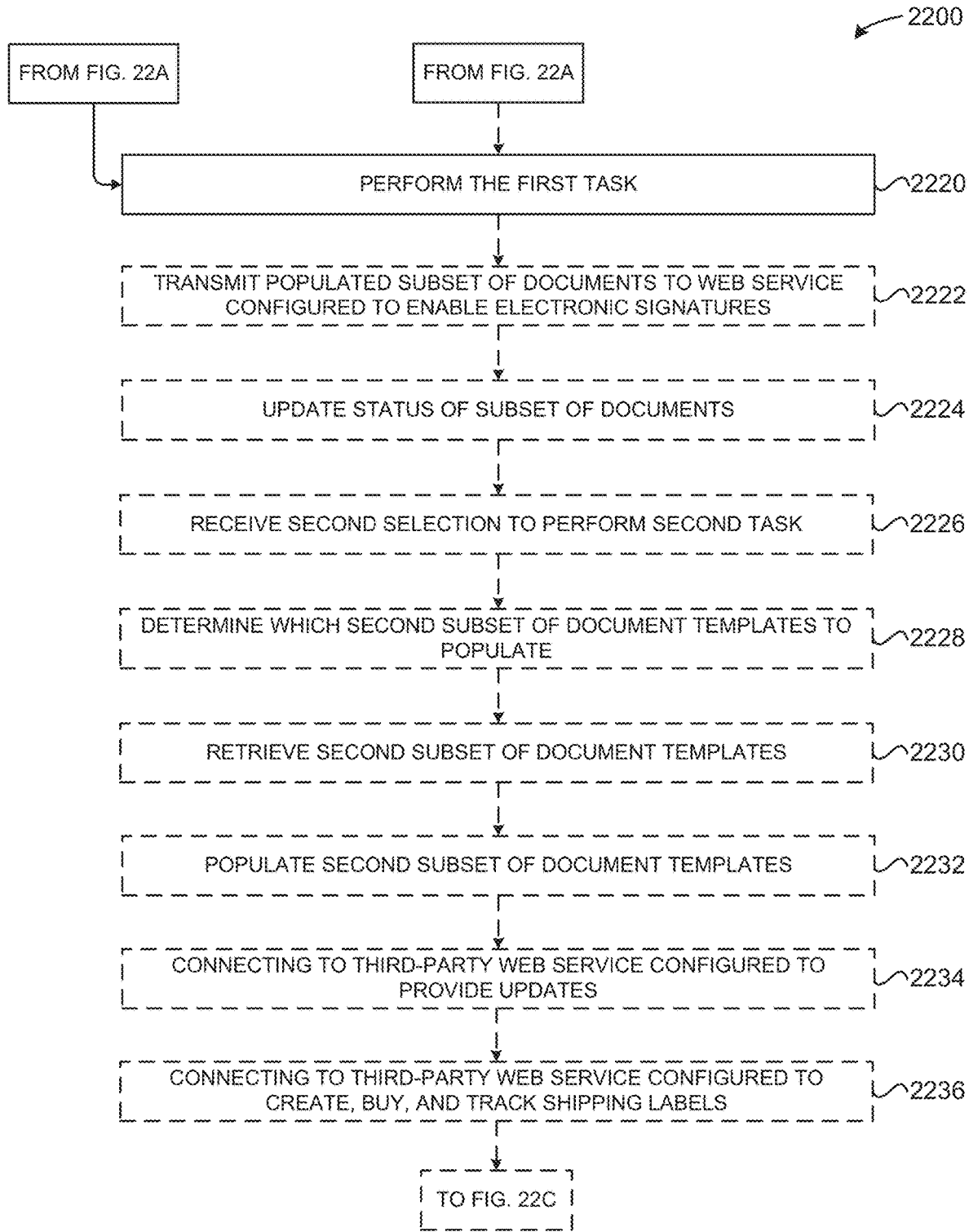
Figure 22C:
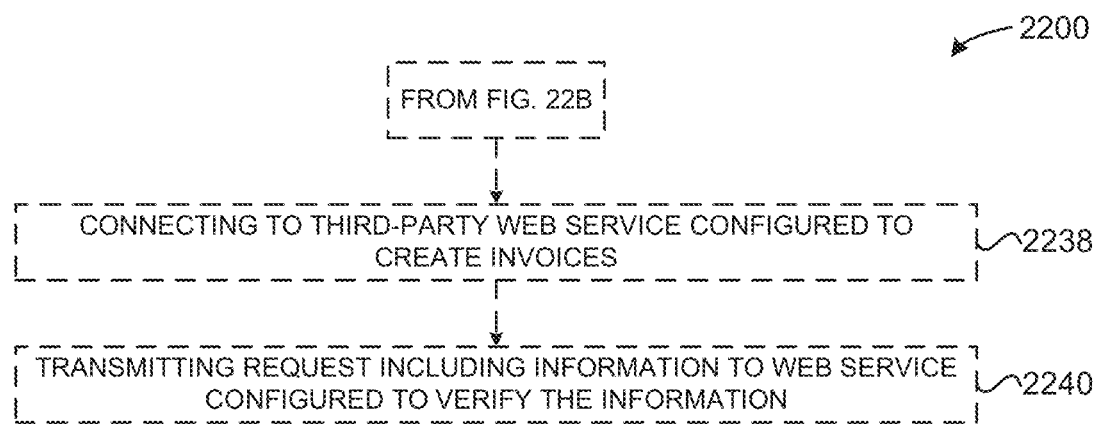

FIGS. 22A-22C illustrate a method 2200 for automated data importation, processing, and form submittal. The method 2200 is not limited to the order of steps as shown; instead, the steps of the method 2200 may be performed in any suitable order. The method 2200 may be implemented on a computing device, such as the computing device 400 of FIG. 4. The method 2200 may be implemented on a system including a processing device communicatively coupled a memory device that stores instructions executable by the processing device to perform the method 2200. The method 2200 may be implemented on a tangible, non-transitory computer-readable medium storing instructions that, when executed, may cause a processing device to perform the steps of the method.

At 2202, the method 2200 includes receiving information pertaining to a client entity. Non-limiting examples of information include a first name, last name, age, and date of birth. For example, information may be received in a medical intake form that includes a first and last name.

At 2204, the method 2200 includes storing the information in a database. For example, the database may store the first and last name of a client. In some embodiments, storing the information in the database includes electronically labeling the information pertaining to the client entity to generate labeled information. In some embodiments the labeled information is organized in the database based on the labeling. In some embodiments, the information is uploaded once and is used to populate a subset of document templates required for any of a plurality of tasks.

At 2206, the method 2200 includes receiving, from a user interface of an application communicatively coupled to the database, a first selection to perform a first task. For example, a user may select an option to submit a request for medical payment to an insurance provider. In some embodiments, the first task includes transmitting a subset of document templates to a target web service. In some embodiments, the target web service is configured to enable electronic signatures on the first subset of document templates prepare an invoice, transmit the first subset of document templates in a particular format, or perform some combination thereof. In some embodiments, the first task is a faxing operation.

At 2208, the method 2200 includes determining, based on the first task, a first subset of document templates to populate from a plurality of document templates. For example, the database may determine that form 527 and 598 are required. As a non-limiting example, DynaPDF may be used to perform this function. In some embodiments, the plurality of document templates include Portable Document Format forms.

At 2210, the method 2200 includes retrieving the selected subset of document templates from the database. For example, the database may retrieve forms 527 and 598. In some embodiments, retrieving the first subset of document templates further includes transmitting a request to a web service of a third-party entity that manages the first subset of document templates and receiving, from the web service, the first subset of document templates.

At 2212, the method 2200 includes populating the first subset of document templates using the information pertaining to the client entity to generate a first populated subset of documents. For example, the database may insert the client's first and last name into forms 527 and 598.

At 2214, in some embodiments where the first task is a faxing operation, the method 2200 may include electronically generating a cover sheet for the client entity. For example, DynaPDF may be used create a cover sheet for faxing.

At 2216, in some embodiments where the first task is a faxing operation, the method 2200 may include combining the cover sheet with the first populated subset of documents to generate a composite document. For example, DynaPDF may combine the cover sheet with forms 527 and 598 to generate a composite document.

At 2218, in some embodiments where the first task is a faxing operation, the method 2200 may include transmitting the composite document to a web service. For example, the composite document may be transmitted to Phaxio.

At 2220, the method 2200 includes performing the first task (e.g. the faxing operation) using the first populated subset of documents. For example, Phaxio may send the composite document by fax.

At 2222, the method 2200 may include transmitting the first populated subset of documents to a web service configured to enable electronic signatures on the first populated subset of documents. For example, forms 527 and 598 may be transmitted to SignRequest.

At 2224, the method 2200 may include, responsive to performing the first task, updating a status of the first subset of document templates in real-time or near real-time, wherein the status of the first subset of document templates is accessible to a plurality of users of the application on a plurality of computing devices. For example, the database may update a status to read "fax sent" the composite document is sent by fax using Phaxio.

At 2226, the method 2200 may include receiving, from the user interface, a second selection to perform a second task, wherein the first task and second task are different. For example, the first task may be faxing the document, while the second task may be shipping the document.

At 2228, the method 2200 may include determining, based on the second task, a second subset of document templates to populate from the plurality of document templates, wherein at least one document template in the second subset of document templates is different than the subset of document templates. For example, because shipping was selected, the database may determine that forms 527 and 590 is required instead of forms 527 and 598. In some embodiments, the plurality of document templates include Portable Document Format forms.

At 2230, the method 2200 may include retrieving the second subset of document templates. For example, the database may retrieve forms 527 and 590.

At 2232, the method 2200 may include populating the second subset of document templates using the information pertaining to the client entity. For example, DynaPDF may populate forms 527 and 590.

At 2234, the method 2200 may include connecting to a third-party web service configured to provide updates, alerts, status reports, or some combination thereof, wherein the updates, alerts, status reports are provided via a text message, an electronic mail message, a third-party application, or some combination thereof. For example, the database may connect to PipeDrive, Slack, or Sendinblue to send out status reports.

At 2236, the method 2200 may include connecting to a third-party web service configured to create, buy, and/or track shipping labels. For example, the database may connect to Shippo in order to create, buy, and/or track shipping labels.

At 2238, the method 2200 may include connecting to a third-party web service configured to create invoices and/or pay invoices with bank transfers. For example, the database may connect to QuickBooks.

At 2240, the method 2200 may include transmitting a request including the information to a web service configured to verify the information. For example, where the information includes a property address, the information may be transmitted to Zillow to verify statistics about the property.

At 2242, the method 2200 may include generating a report presenting summary information tailored for a role of a user of the application, wherein the summary information includes sales, client entities, statuses of cases, statuses of which information is missing from the first subset of documents, the second subset of documents, invoice data, loan information, or some combination thereof. For example, the database may generate a report including missing information from the first subset of documents where the information missing is a social security number.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

Consistent with the above disclosure, the examples of systems and method enumerated in the following clauses are specifically contemplated and are intended as a non-limiting set of examples.

Clause 1. A method comprising:
receiving information pertaining to a client entity;
storing the information in a database;
receiving, from a user interface of an application communicatively coupled to the database, a first selection to perform a first task;
determining, based on the first task, which subset of document templates to populate from a plurality of document templates;
retrieving the subset of document templates from the database;
populating the subset of document templates using the information pertaining to the client entity to generate a populated subset of documents; and
performing the first task using the populated subset of documents.

Clause 2. The method of claim 1, further comprising:

receiving, from the user interface, a second selection to perform a second task, wherein the first task and second task are different;

determining, based on the second task, which second subset of document templates to populate from the plurality of document templates, wherein at least one document template in the second subset of document templates is different than the subset of document templates;

retrieving the second subset of document templates; and populating the second subset of document templates using the information pertaining to the client entity.

Clause 3. The method of any preceding clause, further comprising:

responsive to performing the first task, updating a status of the subset of document templates in real-time or near real-time, wherein the status of the subset of document templates is accessible to a plurality of users of the application on a plurality of computing devices.

Clause 4. The method of any preceding clause, further comprising:

transmitting the populated subset of documents to a web service configured to enable electronic signatures on the populated subset of documents.

Clause 6. The method of any preceding clause, wherein the first task comprises a faxing operation, and the method further comprises:

electronically generating a cover sheet for the client entity;

combining the cover sheet with the populated subset of documents to generate a composite document; and transmitting the composite document to a web service configured to perform the faxing operation.

Clause 7. The method of any preceding clause, wherein the information is uploaded once and is used to populate any subset of document templates required for any of the plurality of tasks.

Clause 8. The method of any preceding clause, wherein the plurality of document templates comprise Portable Document Format forms.

Clause 9. The method of any preceding clause, wherein retrieving the first subset of document templates further comprises:

transmitting a request to a web service of a third-party entity that manages the first subset of document templates; and receiving, from the web service, the first subset of document templates.

Clause 10. The method of any preceding clause, wherein the first task comprises transmitting the first subset of document templates to a target web service, wherein the target web service is configured to enable electronic signatures on the first subset of document templates, prepare an invoice, transmit the first subset of document templates in a particular format, or some combination thereof.

Clause 11. The method of any preceding clause, wherein storing the information in the database further comprises:

electronically labeling the information pertaining to the client entity to generate labeled information; and organizing the labeled information in the database based on the labeling.

Clause 12. The method of any preceding clause, further comprising:

connecting to a third-party web service configured to provide updates, alerts, status reports, or some combination thereof, wherein the updates, alerts, status reports are provided via a text message, an electronic mail message, a third-party application, or some combination thereof.

Clause 13. The method of any preceding clause, further comprising connecting to a third-party web service configured to create, buy, and track shipping labels.

Clause 14. The method of any preceding clause, further comprising connecting to a third-party web service configured to create invoices and pay the invoices with bank transfers.

Clause 15. The method of any preceding clause, further comprising transmitting a request including the information to a web service configured to verify the information.

Clause 16. The method of any preceding clause, further comprising generating a report presenting summary information tailored for a role of a user of the application, wherein the summary information comprises sales, client entities, statuses of cases, statuses of which information is missing from the first subset of documents, invoice data, loan information, or some combination thereof.

Clause 17. A tangible, non-transitory computer-readable medium storing instructions that, when executed, cause a processing device to:

receive information pertaining to a client entity;

store the information in a database;

receive, from a user interface of an application communicatively coupled to the database, a first selection to perform a first task;

determine, based on the first task, which subset of document templates to populate from a plurality of document templates;

retrieve the subset of document templates from the database;

populate the subset of document templates using the information pertaining to the client entity to generate a populated subset of documents; and perform the first task using the populated subset of documents.

Clause 18. The computer-readable medium of any preceding clause, wherein the instructions further cause the processing device to:

receive, from the user interface, a second selection to perform a second task, wherein the first task and second task are different;

determine, based on the second task, which second subset of document templates to populate from the plurality of document templates, wherein at least one document template in the second subset of document templates is different than the subset of document templates;

retrieve the second subset of document templates; and populate the second subset of document templates using the information pertaining to the client entity.

Clause 19. A system comprising:

a memory device storing instructions; and a processing device communicatively coupled to the memory device, the processing device executes the instructions to:

receive information pertaining to a client entity;

store the information in a database;

receive, from a user interface of an application communicatively coupled to the database, a first selection to perform a first task;

determine, based on the first task, which subset of document templates to populate from a plurality of document templates;

retrieve the subset of document templates from the database;

populate the subset of document templates using the information pertaining to the client entity to generate a populated subset of documents; and perform the first task using the populated subset of documents.

Clause 20. The system of any preceding clause, wherein the processing device further executes the instructions to:

receive, from the user interface, a second selection to perform a second task, wherein the first task and second task are different;

determine, based on the second task, which second subset of document templates to populate from the plurality of document templates, wherein at least one document template in the second subset of document templates is different than the subset of document templates;

retrieve the second subset of document templates; and populate the second subset of document templates using the information pertaining to the client entity.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:

receiving, by a device, information pertaining to a client entity, wherein the information is uploaded once and is used to populate any subset of document templates required for any task;

storing, by the device, the information in a database;

receiving, by the device, from a user interface of an application communicatively coupled to the database, a single click of a graphical element to perform a first task;

responsive to the single click of the graphical element:

automatically determining, by the device, based on the first task, a first subset of document templates to populate from a plurality of document templates, the first set of document templates corresponding to a type of document and type of information associated with the first task;

retrieving, by the device, the first subset of document templates from the database, wherein retrieving the first subset of document templates further comprises:

transmitting a request to a web service of a third-party entity that manages the first subset of document templates, and receiving, from the web service, the first subset of document templates;

populating, by the device, the first subset of document templates using the stored information pertaining to the client entity, such that a first populated subset of documents is generated;

preparing an application programming interface (API) request for a third-party web service, wherein the API request comprises one or more commands associated with the first task, and the API request comprises the generated first populated subset of documents;

transmitting, to the third-party web service, the API request to perform the first task; and receiving, from the third-party web service, a response indicating the first task has been completed; and responsive to performing the first task, updating a status of the first subset of document templates in real-time or near real-time, wherein the status of the first subset of document templates is accessible to a plurality of users of the application on a plurality of computing devices.

2. The method of claim 1, further comprising:

receiving, from the user interface, a second selection to perform a second task, wherein the first task and second task are different;

determining, based on the second task, which second subset of document templates to populate from the plurality of document templates, wherein at least one document template in the second subset of document templates is different than the subset of document templates;

retrieving the second subset of document templates; and populating the second subset of document templates using the information pertaining to the client entity.

3. The method of claim 1, further comprising:

transmitting the first populated subset of documents to a web service configured to enable electronic signatures on the populated subset of documents.

4. The method of claim 1, wherein the first task comprises a faxing operation, and the method further comprises:

electronically generating a cover sheet for the client entity;

combining the cover sheet with the first populated subset of documents to generate a composite document; and transmitting the composite document to a web service configured to perform the faxing operation.

5. The method of claim 1, wherein the plurality of document templates comprise Portable Document Format forms.

6. The method of claim 1, wherein the first task comprises transmitting the first subset of document templates to a target web service, wherein the target web service is configured to enable electronic signatures on the first subset of document templates, prepare an invoice, transmit the first subset of document templates in a particular format, or some combination thereof.

7. The method of claim 1, wherein storing the information in the database further comprises:

electronically labeling the information pertaining to the client entity to generate labeled information; and organizing the labeled information in the database based on the labeling.

8. The method of claim 1, further comprising:

connecting to a third-party web service configured to provide updates, alerts, status reports, or some combination thereof, wherein the updates, alerts, status reports are provided via a text message, an electronic mail message, a third-party application, or some combination thereof.

9. The method of claim 1, further comprising connecting to a third-party web service configured to create, buy, and track shipping labels.

10. The method of claim 1, further comprising connecting to a third-party web service configured to create invoices and pay the invoices with bank transfers.

11. The method of claim 1, further comprising transmitting a request including the information to a web service configured to verify the information.

12. The method of claim 1, further comprising generating a report presenting summary information tailored for a role of a user of the application, wherein the summary information comprises sales, client entities, statuses of cases, statuses of which information is missing from the first subset of documents, invoice data, loan information, or some combination thereof.

13. A tangible, non-transitory computer-readable medium storing instructions that, when executed, cause a processing device to:
receive information pertaining to a client entity, wherein the information is uploaded once and is used to populate any subset of document templates required for any task;
store the information in a database;
receive, from a user interface of an application communicatively coupled to the database, a single click of a graphical element to perform a first task;
responsive to the single click of the graphical element:
automatically determine, based on the first task, a first subset of document templates to populate from a plurality of document templates, the first set of document templates corresponding to a type of document and type of information associated with the first task;
retrieve the first subset of document templates from the database,
wherein retrieving the first subset of document templates further comprises:
transmitting a request to a web service of a third-party entity that manages the first subset of document templates, and
receiving, from the web service, the first subset of document templates;
populate the first subset of document templates using the stored information pertaining to the client entity, such that a first populated subset of documents is generated;
prepare an application programming interface (API) request for a third-party web service, wherein the API request comprises one or more commands associated with the first task, and the API request comprises the generated first populated subset of documents;
transmit, to the third-party web service, the API request to perform the first task; and
receive, from the third-party web service, a response indicating the first task has been completed; and
responsive to performing the first task, updating a status of the first subset of document templates in real-time or near real-time, wherein the status of the first subset of document templates is accessible to a plurality of users of the application on a plurality of computing devices.

14. The computer-readable medium of claim 13, wherein the instructions further cause the processing device to:
receive, from the user interface, a second selection to perform a second task, wherein the first task and second task are different;
determine, based on the second task, which second subset of document templates to populate from the plurality of document templates, wherein at least one document template in the second subset of document templates is different than the subset of document templates;
retrieve the second subset of document templates; and
populate the second subset of document templates using the information pertaining to the client entity.

15. A system comprising:
a memory device storing instructions; and
a processing device communicatively coupled to the memory device, the processing device executes the instructions to:
receive information pertaining to a client entity, wherein the information is uploaded once and is used to populate any subset of document templates required for any task;
store the information in a database;
receive, from a user interface of an application communicatively coupled to the database, a single click of a graphical element first selection to perform a first task;
responsive to the single click of the graphical element:
automatically determine, based on the first task, a first subset of document templates to populate from a plurality of document templates, the first set of document templates corresponding to a type of document and type of information associated with the first task;
retrieve the first subset of document templates from the database,
wherein retrieving the first subset of document templates further comprises:
transmitting a request to a web service of a third-party entity that manages the first subset of document templates, and
receiving, from the web service, the first subset of document templates;
populate the first subset of document templates using the stored information pertaining to the client entity, such that a first populated subset of documents is generated;
prepare an application programming interface (API) request for a third-party web service, wherein the API request comprises one or more commands associated with the first task, and the API request comprises the generated first populated subset of documents;
transmit, to the third-party web service, the API request to perform the first task; and
receive, from the third-party web service, a response indicating the first task has been completed; and
responsive to performing the first task, updating a status of the first subset of document templates in real-time or near real-time, wherein the status of the first subset of document templates is accessible to a plurality of users of the application on a plurality of computing devices.

16. The system of claim 15, wherein the processing device further executes the instructions to:
receive, from the user interface, a second selection to perform a second task, wherein the first task and second task are different;
determine, based on the second task, which second subset of document templates to populate from the plurality of document templates, wherein at least one document template in the second subset of document templates is different than the subset of document templates;
retrieve the second subset of document templates; and
populate the second subset of document templates using the information pertaining to the client entity.

17. The system of claim 15, wherein the processing device further executes the instructions to:
generate a report presenting summary information tailored for a role of a user of the application, wherein the summary information comprises sales, client entities, statuses of cases, statuses of which information is missing from the first subset of documents, invoice data, loan information, or some combination thereof.

18. The computer-readable medium of claim 13, wherein the processing device further executes the instructions to:
transmit the first populated subset of documents to a web service configured to enable electronic signatures on the populated subset of documents.

19. The system of claim 15, wherein the processing device further executes the instructions to:
transmit the first populated subset of documents to a web service configured to enable electronic signatures on the populated subset of documents.

20. The system of claim 15, wherein the processing device further executes the instructions to:
connect to a third-party web service configured to create invoices and pay the invoices with bank transfers.

* * * * *